United States Patent
Mao et al.

(10) Patent No.: US 11,553,018 B2
(45) Date of Patent: Jan. 10, 2023

(54) DYNAMICALLY SWITCHED MULTICAST DELIVERY

(71) Applicant: Comcast Cable Communications, LLC, Philadelphia, PA (US)

(72) Inventors: Weidong Mao, West Windsor, NJ (US); John G. Bevilacqua, Boulder, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 233 days.

(21) Appl. No.: 14/681,619

(22) Filed: Apr. 8, 2015

(65) Prior Publication Data

US 2015/0288733 A1 Oct. 8, 2015

Related U.S. Application Data

(60) Provisional application No. 61/976,875, filed on Apr. 8, 2014.

(51) Int. Cl.
*H04L 65/611* (2022.01)
*H04L 65/75* (2022.01)
*H04L 67/52* (2022.01)

(52) U.S. Cl.
CPC .......... *H04L 65/611* (2022.05); *H04L 65/762* (2022.05); *H04L 67/52* (2022.05)

(58) Field of Classification Search
None
See application file for complete search history.

(56) References Cited

U.S. PATENT DOCUMENTS

| | | | |
|---|---|---|---|
| 6,112,239 | A | 8/2000 | Kenner et al. |
| 7,428,725 | B2 | 9/2008 | Niyogi et al. |
| 7,567,671 | B2 | 7/2009 | Gupte |
| 7,653,687 | B2 | 1/2010 | Reisman |
| 7,747,720 | B2 | 6/2010 | Toebes et al. |

(Continued)

FOREIGN PATENT DOCUMENTS

| | | |
|---|---|---|
| CA | 2774363 | 3/2012 |
| CA | 2774480 | 3/2012 |

(Continued)

OTHER PUBLICATIONS

European Office Action—EP App 10817786.6—dated Mar. 9, 2016.

(Continued)

*Primary Examiner* — Younes Naji
(74) *Attorney, Agent, or Firm* — Banner & Witcoff, Ltd.

(57) ABSTRACT

According to some aspects, methods and systems may include receiving, by computing device from one or more client devices, a plurality of requests for one or more content items formatted in a first format and determining whether to multicast the one or more content items based on a data structure configured with one or more conditions associated with multicasting content. The methods and systems may also include transmitting, to the one or more client devices, the one more content items via one or more multicast streams if the requests meet a first condition of the one or more conditions. The methods and systems may also include formatting the one or more content items in a second format prior to the transmitting if network resources fail to meet a second condition of the one or more conditions.

28 Claims, 8 Drawing Sheets

(56) References Cited

U.S. PATENT DOCUMENTS

| | | |
|---|---|---|
| 8,060,631 B2 | 11/2011 | Collart et al. |
| 8,146,157 B2 | 3/2012 | Meier et al. |
| 8,219,134 B2 | 7/2012 | Maharajh et al. |
| 8,234,301 B2 | 7/2012 | Kii et al. |
| 8,352,627 B1 | 1/2013 | Mackie |
| 8,527,639 B1 | 9/2013 | Liskov et al. |
| 8,548,946 B2 | 10/2013 | Hughes, Jr. |
| 9,197,559 B1* | 11/2015 | Cloonan ............... H04L 43/08 |
| 2002/0091760 A1 | 7/2002 | Rozen |
| 2003/0028890 A1 | 2/2003 | Swart et al. |
| 2003/0236895 A1 | 12/2003 | Ohkubo et al. |
| 2004/0054786 A1 | 3/2004 | Kjellberg et al. |
| 2004/0205221 A1 | 10/2004 | Yamanaka et al. |
| 2004/0249768 A1 | 12/2004 | Kontio et al. |
| 2005/0010963 A1 | 1/2005 | Zeng et al. |
| 2005/0188048 A1 | 8/2005 | Yuan et al. |
| 2006/0259926 A1 | 11/2006 | Scheelke et al. |
| 2007/0124201 A1 | 5/2007 | Hu et al. |
| 2007/0140107 A1 | 6/2007 | Eckert et al. |
| 2007/0147411 A1* | 6/2007 | Bijwaard ............ H04L 65/1101 370/466 |
| 2007/0153825 A1 | 7/2007 | Cho et al. |
| 2007/0168523 A1 | 7/2007 | Jiang et al. |
| 2007/0183441 A1 | 8/2007 | Medin |
| 2007/0220573 A1 | 9/2007 | Chiussi et al. |
| 2007/0232221 A1 | 10/2007 | Miyata |
| 2007/0294733 A1 | 12/2007 | Aaron et al. |
| 2007/0298708 A1* | 12/2007 | Maggenti ........... H04W 72/005 455/3.01 |
| 2008/0140850 A1 | 6/2008 | Gade et al. |
| 2008/0141317 A1 | 6/2008 | Radloff et al. |
| 2008/0151807 A1 | 6/2008 | Meier et al. |
| 2008/0160956 A1 | 7/2008 | Jackson et al. |
| 2008/0279100 A1 | 11/2008 | Yuan et al. |
| 2009/0077254 A1 | 3/2009 | Darcie et al. |
| 2009/0106792 A1 | 4/2009 | Kan et al. |
| 2009/0168679 A1 | 7/2009 | Benjamim et al. |
| 2009/0190474 A1 | 7/2009 | Gahm et al. |
| 2009/0248886 A1 | 10/2009 | Tan et al. |
| 2009/0307307 A1 | 12/2009 | Igarashi |
| 2009/0307758 A1 | 12/2009 | Lindsley et al. |
| 2010/0017824 A1 | 1/2010 | Malik |
| 2010/0043067 A1 | 2/2010 | Varadhan et al. |
| 2010/0077440 A1 | 3/2010 | Medina et al. |
| 2010/0095012 A1 | 4/2010 | Zuckerman et al. |
| 2010/0118754 A1 | 5/2010 | Burton et al. |
| 2010/0153573 A1 | 6/2010 | Huang |
| 2010/0223240 A1 | 9/2010 | Cooper |
| 2010/0239086 A1 | 9/2010 | Johnston et al. |
| 2010/0312857 A1 | 12/2010 | Ehlers |
| 2011/0013551 A1 | 1/2011 | Shiroko et al. |
| 2011/0051646 A1* | 3/2011 | Rice ..................... H04L 65/611 370/312 |
| 2011/0064079 A1* | 3/2011 | Lim ..................... H04L 12/185 370/390 |
| 2011/0083153 A1 | 4/2011 | Cedervall et al. |
| 2011/0119703 A1* | 5/2011 | Schlack ............ H04N 21/6405 725/35 |
| 2011/0141218 A1 | 6/2011 | Stancato |
| 2011/0202965 A1 | 8/2011 | Henry et al. |
| 2011/0209025 A1 | 8/2011 | Takahashi |
| 2011/0252082 A1 | 10/2011 | Cobb et al. |
| 2011/0252100 A1 | 10/2011 | Raciborski et al. |
| 2011/0252115 A1 | 10/2011 | Karlsson et al. |
| 2012/0233644 A1* | 9/2012 | Rao ................... H04M 1/72412 725/62 |
| 2013/0007226 A1* | 1/2013 | White ............... H04N 21/4383 709/219 |
| 2013/0024582 A1 | 1/2013 | Rodrigues |
| 2013/0051300 A1* | 2/2013 | He ....................... H04W 4/06 370/312 |
| 2013/0094536 A1* | 4/2013 | Hui ....................... H04B 1/713 375/135 |
| 2013/0102253 A1* | 4/2013 | Marsh ................. H04W 76/15 455/41.2 |
| 2013/0163444 A1* | 6/2013 | Tee ..................... H04W 72/005 370/312 |
| 2013/0268577 A1 | 10/2013 | Oyman |
| 2013/0301424 A1* | 11/2013 | Kotecha ............... H04L 65/611 370/242 |
| 2014/0092818 A1* | 4/2014 | Yen .................... H04W 72/0486 370/328 |
| 2014/0177504 A1* | 6/2014 | Sayeed ................ H04W 76/40 370/312 |
| 2014/0189052 A1* | 7/2014 | Gholmieh .......... H04N 21/2407 709/217 |
| 2014/0269437 A1* | 9/2014 | Kotecha ................ H04W 4/06 370/312 |
| 2014/0281011 A1* | 9/2014 | Zarom ................... H04L 65/70 709/231 |
| 2014/0282777 A1* | 9/2014 | Gonder .............. H04N 21/2225 725/116 |
| 2015/0189394 A1* | 7/2015 | French .............. H04N 21/4381 725/109 |
| 2015/0195328 A1* | 7/2015 | Rehan ................... H04L 65/762 709/219 |
| 2015/0365885 A1* | 12/2015 | Yang ................. H04W 52/0216 370/312 |

FOREIGN PATENT DOCUMENTS

| | | | |
|---|---|---|---|
| EP | 1376990 A2 | 1/2004 | |
| EP | 10817785.8 | 4/2012 | |
| EP | 10817786.6 | 4/2012 | |
| JP | 5321535 B2 * | 10/2013 | ......... H04L 12/1859 |
| WO | 2002-017213 A2 | 2/2002 | |
| WO | 2004/029771 A2 | 4/2004 | |
| WO | 2014004787 A1 | 1/2014 | |
| WO | WO-2016042385 A1 * | 3/2016 | .............. H04W 4/06 |

OTHER PUBLICATIONS

Ahmad, I. et al—"Video Transcoding: An Overview of Various Techniques and Research Issues"—IEEE Transactions on Multimedia—IEEE Service Center—Piscataway, NJ, US—Oct. 1, 2005.

Canadian Office Action—CA App. 2,774,480—dated Oct. 3, 2016.

Canadian Office Action—CA App 2,774,363—dated Sep. 27, 2016.

International Search Report for PCT/US2010/048974, dated Nov. 3, 2010.

International Search Report for PCT/US2010/48975, dated Nov. 3, 2010.

Extended European Search Report—EP Application 10817786.6—dated Feb. 4, 2015.

Partial Supplementary European Search Report—EP Application 10817785.8—dated Feb. 19, 2015.

Rakesh Mohan et al. "Adapting Multimedia Internet Content for Universal Access." IEEE Transactions on Multimedia, IEEE Service Center, Piscataway, NJ, US. Mar. 1, 1999.

European Search Report—EP App. 10817785.8—dated Jun. 25, 2015.

European Supplementary Search Report—EP 10817785.8—dated Jul. 14, 2015.

Response to European Office Action—EP 10817786.6—dated Aug. 19, 2015.

Response to European Search Report—EP Appl. 10817785.8—dated Jan. 21, 2016.

European Office Action—EP App No. 10817785.8—dated Aug. 30, 2016.

Kun-Lung Wu et al—"Segment-Based Proxy Caching of Multimedia Streams"—May 2001—Hong Kong.

Mathais Wien, et al.—"Real-Time System for Adaptive Video Streaming Based on SVC"—IEEE Transactions on Circuits and Systems for Video Technology—Sep. 2007.

Nov. 15, 2017—European Consultation—EP 10817786.6.

Nov. 17, 2017—European Office Action—EP 10817785.8.

Jan. 4, 2018—European Office Action—EP 10817786.6.

Sep. 25, 2017—Canadian Office Action—CA 2,774,480.

(56) References Cited

OTHER PUBLICATIONS

Aug. 30, 2017—Canadian Office Action—CA 2,774,363.
Aug. 22, 2019—Canadian Office Action—CA 2,774,480.
Apr. 20, 2020—Canadian Office Action—CA 2,774,480.
Jul. 8, 2021—Canadian Office Action—CA 2,774,480.
U.S. Appl. No. 14/591,674, Dynamic Content Packaging, filed Jan. 7, 2015.
U.S. Appl. No. 14/179,171, Control Plane Architecture for Multicast Cache-Fill, filed Feb. 12, 2014.
U.S. Appl. No. 13/496,338, Dynamic Content Packaging in a Content Delivery System, filed Apr. 26, 2012.
Aug. 15, 2018—Canadian Office Action—CA 2,774,363.
Aug. 23, 2018—Canadian Office Action—CA 2,774,480.

* cited by examiner

DYNAMICALLY SWITCHED MULTICAST DELIVERY

The present application claims priority to U.S. Provisional Application No. 61/976,875, entitled "Control Plane for Dynamic Switched IPTV Multicast Delivery," filed Apr. 8, 2014, which is incorporated herein by reference in its entirety.

BACKGROUND

Content providers have long sought to save network resources and bandwidth by providing content in the most efficient way possible. Previously, content providers have determined whether to multicast content or unicast content by statically preconfiguring a multicast server with what a human administrator thought was the most popular channels. However, this may be not efficient, because the popularity of channels changes in real-time, and manually configuring a multicast lineup cannot find the most optimal use of network resources at any given time. There remains an ever-present need to dynamically determine when to multicast content.

SUMMARY

The following summary is for illustrative purposes only, and is not intended to limit or constrain the detailed description.

Features described herein relate generally to dynamically determining whether to multicast content at a particular time. Such content may be Internet Protocol television (IPTV) content or HTTP content. Other types of content may also be used in accordance with disclosed features. Content providers may desire to multicast popular programs to save network resources instead of unicasting these programs. However, multicasting too many channels or programs may result in network congestion and loss of overall network accessibility. According to aspects described herein, a multicast controller, local office, or other entity may determine whether to multicast content based on one or more characteristics of the requests for content, such as the requested bitrate (or bitrate capability of a requesting device), requested resolution (or resolution capability of a requesting device), requested codec, elapsed time associated with a content request, streaming format, location of a user device, gateway, termination system transmitting/receiving the content request, network bandwidth usage/availability, network bandwidth limitations/capability, content format (e.g., screen size, operating system compatibility, file type, and the like.

For example, a multicast controller may determine that there may be enough user devices (e.g., above a predefined threshold) in a particular geographical area that may be requesting a program at a particular bitrate, for a particular resolution, and for a particular codec. The multicast controller may then instruct a multicast server that may be servicing that particular geographical area to setup and/or transmit a multicast of the requested program at that particular bitrate, resolution, and codec to one or more termination systems in that geographical area servicing the requesting user devices.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
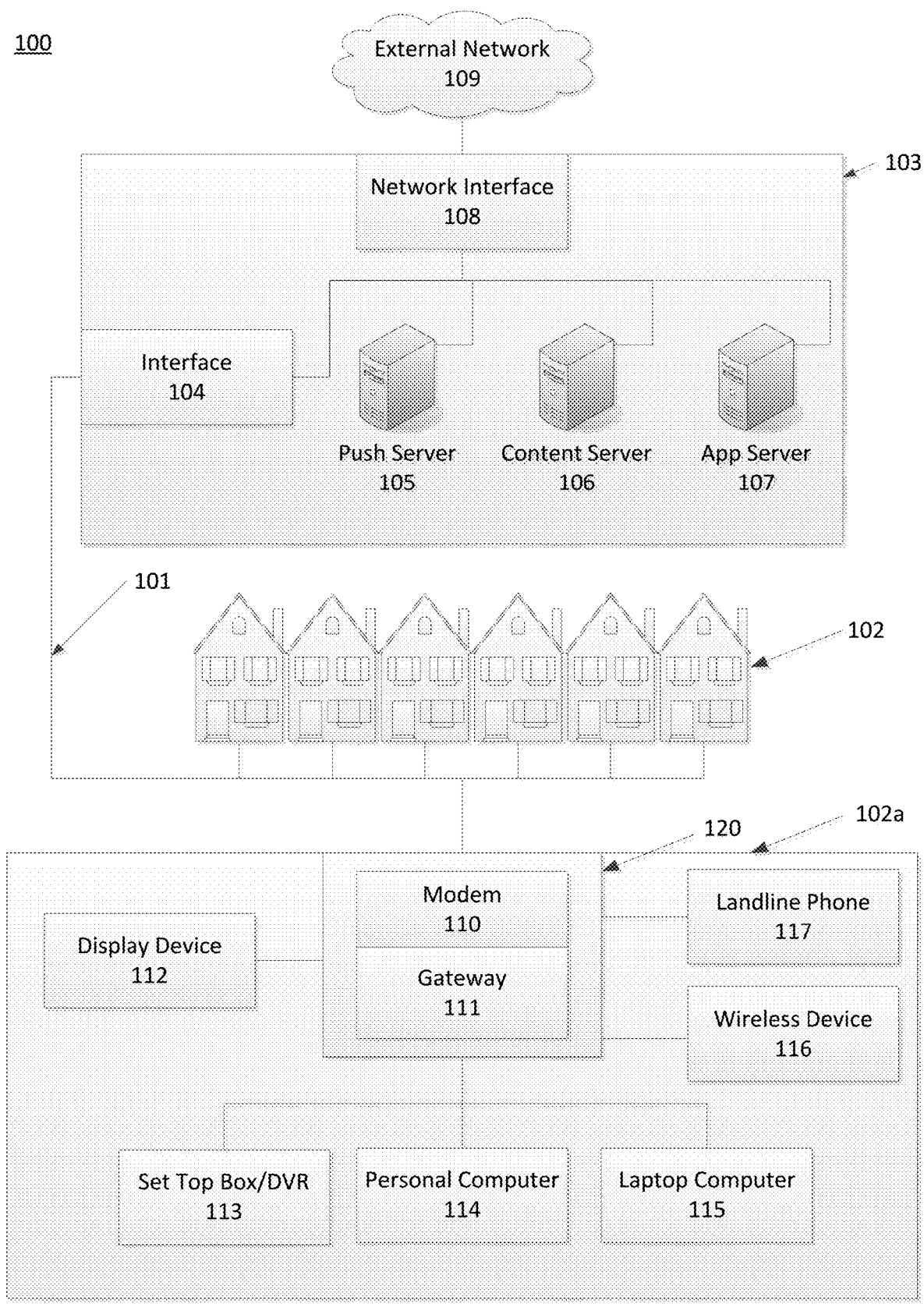
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as an interface 104 (e.g., a termination system). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include one or more push notification servers 105. The one or more push notification servers 105 may generate push notifications to deliver data and/or commands to the various premises 102 in the network (or more specifically, to the devices in the premises 102 that may be configured to detect such notifications). The local office 103 may also include one or more content servers 106. The one or more content servers 106 may be one or more computing devices that may be configured to provide content to users at their premises. This content may be, for example, video on demand movies, television programs, songs, text listings, etc. The one or more content servers 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An example application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an example application server 107 may be responsible for collecting television program listings information and generating a data download for electronic program guide listings. An example application server 107 may be responsible for monitoring user viewing habits and collecting that information for use in selecting advertisements. Yet another example application server 107 may be responsible for formatting and inserting advertisements in a video stream being transmitted to the premises 102. Although shown separately, one of ordinary skill in the art will appreciate that the one or more push servers 105, the one or more content servers 106, and the one or more application servers 107 may be combined. Further, here the one or more push servers 105, the one or more content servers 106, and the one or more application servers 107 may be shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem may be shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
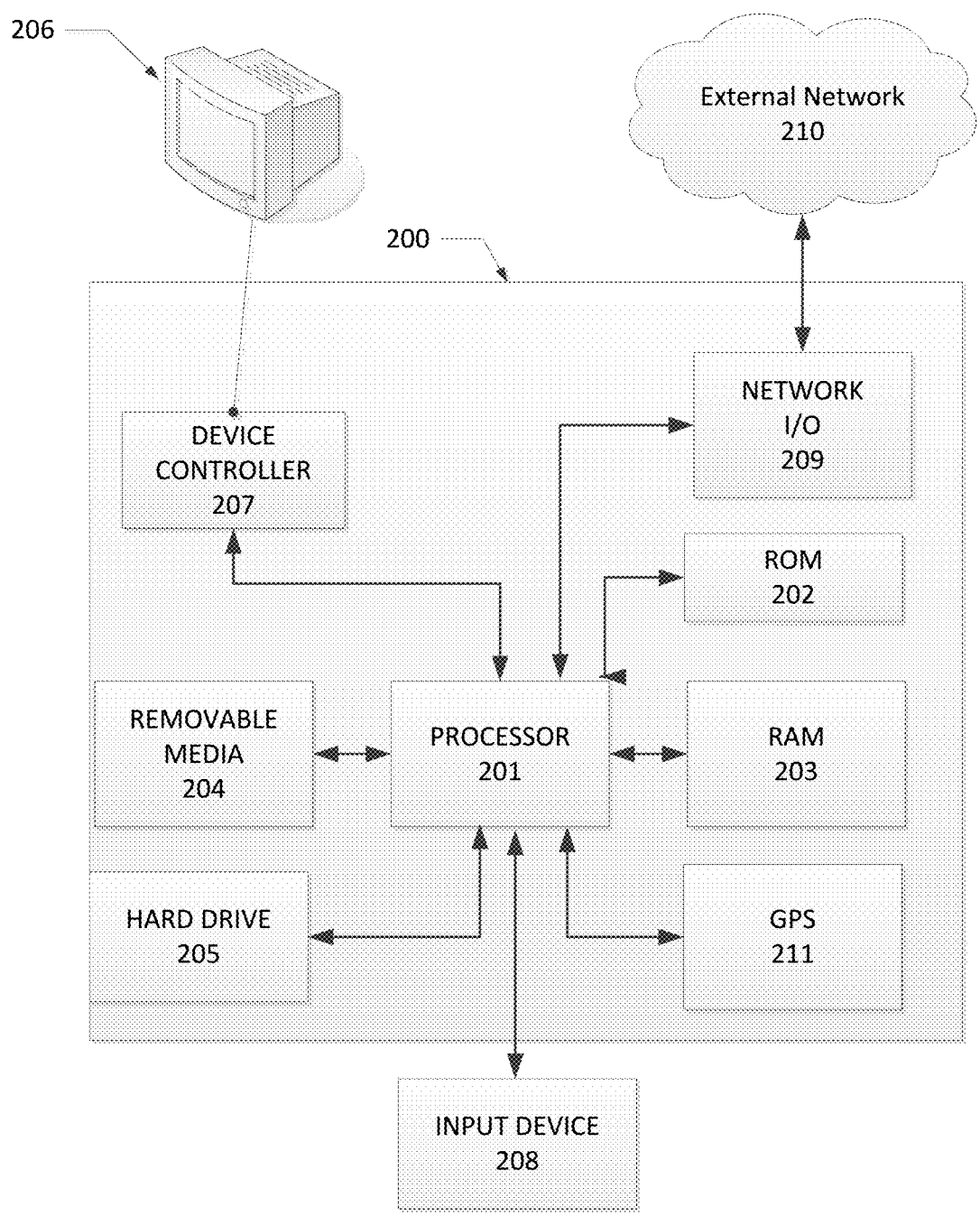
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or internal display), and may include one or more output device controllers 207, such as a video processor or audio processor. There may also be one or more user input devices 208, such as a remote control, keyboard, mouse, touch screen, microphone, motion sensor, camera, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example may be a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures may be contemplated within the scope of computer executable instructions and computer-usable data described herein.

As discussed above, the central office of an information distribution or access network may transmit information downstream to various user devices. The transmitted information may include content for consumption (e.g., playback, viewing, listening, display, storage, etc.) by a user via user equipment, such as a gateway interface device (e.g., a gateway interface device 111 of FIG. 1) and/or other computing device (e.g., one or more televisions 112, one or more additional STBs 113, one or more personal computers 114, one or more laptop computers 115, one or more wireless devices 116 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

For example, such managing may include requesting, creating and handling various sessions (e.g., user sessions, multicast group sessions, cache fill sessions, quality of service sessions); managing transmission of the content (e.g., managing the establishing of transmissions providing unicast content, such as on demand, and linear content, such as multicast content); monitoring usage data of the distribution network, and/or handling requests and notifications from user equipment. As another example, managing may include managing the content discovery, content locating and content delivery processes of the distribution network. In some embodiments, the managing may be implemented using IP (Internet Protocol) and/or HTTP (Hypertext Transfer Protocol) based processes. For example, communication between various devices may be performed using HTTP and/or IP packets. In one example, a session manager server may locate a streaming server and/or a multicast address for a particular content item, and may notify user equipment (e.g., via a multicast controller and/or multicast server) of the streaming server and/or multicast address for the particular content item using HTTP or IP packets. The user equipment may receive the particular content item (via, for example, a unicast signal and/or a multicast signal) by receiving HTTP (or IP) packets that include fragments of the content item and metadata identifying the streaming server and/or multicast address. In some embodiments, communication between devices may use only a single protocol (e.g., only HTTP packets or IP packets). In some embodiments, communication between devices may use multiple protocols. Content items may also be transmitted using the single protocol (e.g., HTTP packets including fragments of content items). Details of these processes, and others, will be discussed in further detail below.

Content discovery processes may include supporting the discovery of content for various content items being provided by or available on a distribution network. The content discovery processes may support the discovery of content items for multicast, linear, or other type of transmission. In some embodiments, content discovery and the various related processes may use an HTTP-based approach (e.g., communication may be via HTTP and/or IP packets) that includes communication between user equipment, application servers, and other various servers of the network.

Content locating processes may include supporting the setup of various sessions and managing the resources of the information distribution network. In some embodiments, content locating processes may enforce entitlement procedures and digital rights management (DRM) licenses. Additionally, in some embodiments, content locating and the various related processes may use an HTTP based approach that includes communication between user equipment, session manager servers, and other servers in and out of the network.

Content delivery processes may include supporting the streaming of the content items from various servers, such as a streaming server of the central office. In some embodiments, content delivery processes may enable user equipment to receive multicast signals (e.g., signals directed at a plurality and/or group of user equipment) and/or receive unicast signals (e.g., signals directed at a specific user device). Additionally, in some embodiments, content streaming and the various related processes may use an HTTP or IP based approach that includes communication between user equipment, content servers, and other servers of the central office.

Figure 3:
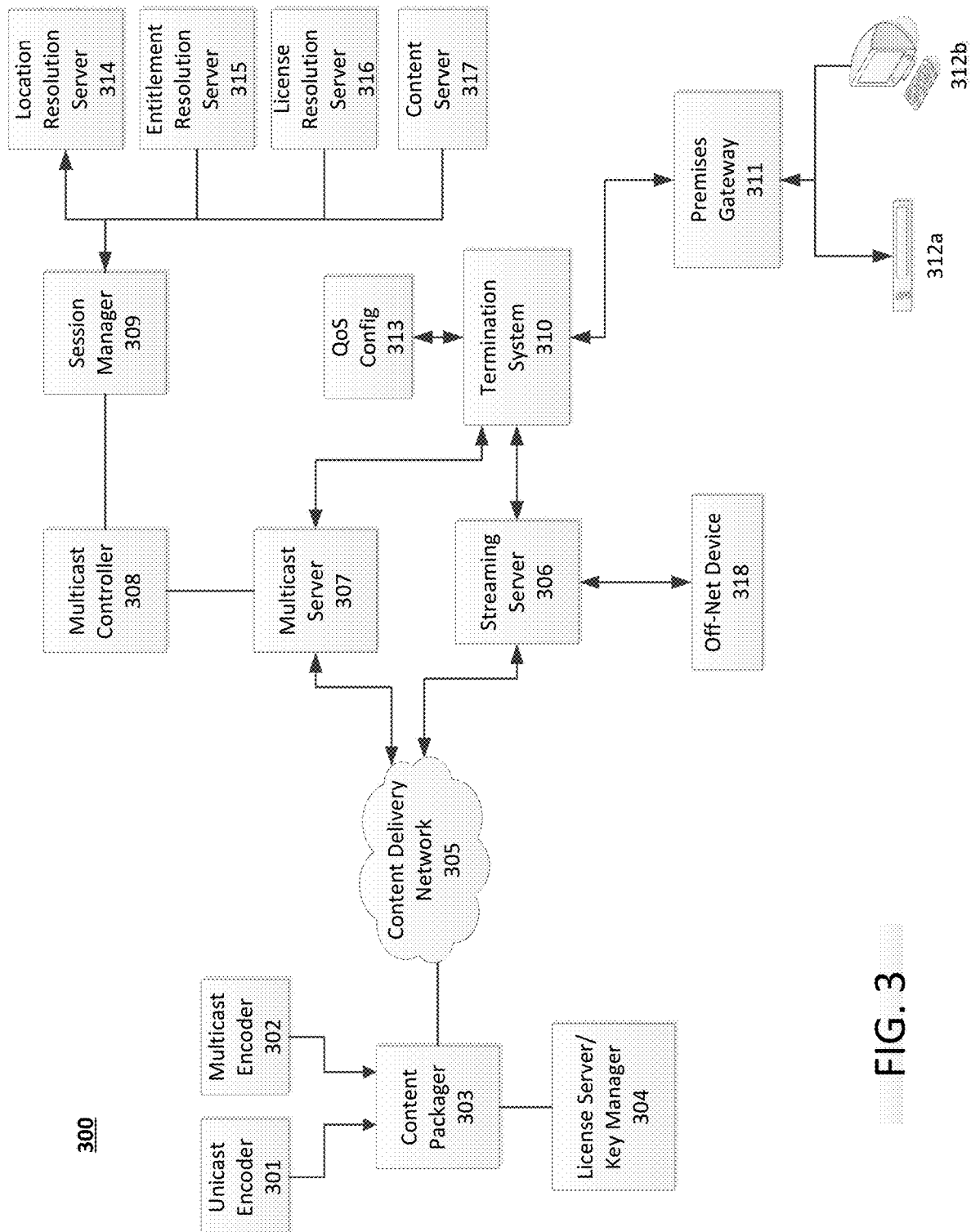
FIG. 3 illustrates an example system in accordance with aspects of the present disclosure.

FIG. 3 illustrates an example system 300 that may be implemented on the network 100, and which may be used to implement various features described herein to supply various content to users. The example system 300 may include one or more of the components of or associated with the network 100 or the device 200. In one or more embodiments, the components of system 300 may include one or more components or computing devices disclosed herein (e.g., components of the local office 103, the device 200, and the like). The system 300 may include one or more sources of the content. For example, in the case of video content (e.g., audio/video content), there may be one or more unicast content encoders 301, each of which may include an application server (such as application server 107) configured to store video content such as movies, television shows, video clips, musical videos, etc. The unicast content encoders 301 may also be configured to provide video on demand (VOD) or linear content. The encoders 301 may include encoding hardware and/or software to provide content in a desired format, such as MPEG.

The system 300 may also include one or more multicast content encoders 302. Multicast content encoders 302 may be similar to unicast content encoders 301.

The system 300 may include one or more content packagers 303. The content packager 303 may be another application server, but configured to receive content and package it for delivery to users. This packaging may include, for example, reformatting the content (e.g., video resolution conversion, coder/decoder conversion, audio conversion, compression altering, synchronizing, etc.), encrypting the content, and segmenting the content (e.g., a two-hour movie may be divided into a plurality of discrete time segments for delivery).

The system 300 may include a license server/key manager 304, which may be a server configured to manage content entitlement. For example, the manager 304 may contain encryption and/or decryption keys, and can supply those keys to packager 303 for use in encrypting content for delivery. The manager 304 may also store information identifying users, and the level(s) of service to which the users may be entitled, and may make determinations as to whether a particular user may be actually entitled to receive a piece of requested content.

The content delivery network (CDN) 305 may be any desired type of communication network, such as network 100, network 109, and/or network 210. The network 305 may span a large geographic area, and may be used to disseminate content or make content accessible. According to some aspects, the CDN 305 may be a cloud network, and may be a control plane or bearer plane that carries signaling traffic, and may be responsible for routing (e.g., via one or more routers). The CDN 305 may be a hierarchy of web caches, web servers, and content routers. These web caches and servers may store information, such as manifest files (which will be discussed below in more detail). The CDN 305 may be configured to provide communications and/or content to and from the content packager 303. According to some aspects, the CDN 305 may include the encoders 301 and 302, the content packager 303, and or the manager 304, and such reference to the CDN 305 may include one or more of these components 301-304.

According to some aspects, some content may be supplied to a streaming server 306. The streaming server 306 may be a server configured to receive packaged content, and generate a unicast stream of that content for delivery to a user or device. The streaming server 306 may be the content server 106.

Another example may be a multicast server 307. Like the streaming server 306, the multicast server 307 may also be configured to generate a stream of packaged content. However, the multicast server 307's stream may be a multicast stream, configured to be received by a plurality of recipient users or devices. According to some aspects, multicast server 307 may be, may be a part of, and/or communicate with a converged regional area network (CRAN). A CRAN network may carry high speed data, such as voice data, as well as audio/video data. In some instances, network 305 (e.g., via a lowest edge cache) may communicate with the multicast server 307. A multicast server 307 may serve (e.g., via one or more routers) one or more devices (e.g., termination systems, gateways, user devices, etc.), and may serve one or more devices located in (or otherwise associated with) a location, such as a geographical location. The routing may be performed by a PIM (protocol independent multicast) routing protocol. For example, a multicast server 307 may serve, via one or more routers, 100 termination systems that may be located in a section of Boston. These 100 termination systems may each interface with 250 gateway devices (e.g., modems, etc.). Each of these gateway devices may interface with one or more user devices (e.g., smartphone, tablet, smartwatch, laptop, set-top box, computing device, etc.).

The multicast server 307 may operate at the direction of a multicast controller 308, which may in turn communicate with a session manager 309 to establish multicast sessions for the delivery of various pieces of content. The multicast controller 308 may instruct the multicast server 307 to create or setup a multicast session/stream based on characteristics of requests for content made by one or more user device, such as the number of user device requests, content resolution requested, codec requested, content bitrate requested, etc. For example, if a plurality of user devices requests a content item, and the number of those requests satisfies a threshold number, then multicast controller 308 may instruct multicast server 307 to create and then transmit a multicast for that content item. In one example, a data structure may indicate that the threshold number for setting up a multicast stream may be 40 devices per termination system. In this example, if 50 devices connected to a first termination system 310 may be requesting a Celtics game, and 55 devices connected to a second termination system 310 may be requesting the Celtics game, then a multicast controller 308 may instruct a multicast server 307 servicing both of the first and second termination systems to multicast the game to these two termination systems. In some cases, the content requests may be for user devices having a particular maximum resolution, and thus multicast controller may instruct multicast server 307 to multicast the content item below that maximum resolution (e.g., when there may be insufficient network resources to transmit at the maximum resolution) or multicast at that maximum resolution (e.g., when there may be sufficient network resources to transmit at the maximum resolution).

The session manager 309 may be configured to manage one or more sessions of the distribution network by interfacing with various devices in the distribution network and communicating session information with the various devices. In some embodiments, the sessions that may be managed by session manager 309 may include a user session, a multicast group session, a cache fill session, and/or a QoS flow session. For example, a user session may be created upon a user device requesting content, and may include information related to the requested content (e.g., user device screen size, resolution range, bitrate rang, codec, streaming format, etc.) and the entitlements of the user device (e.g., whether the user device has authority to access the requested content). A multicast group session may be created upon a user device joining a multicast group of a particular group of user equipment, and may include information related to the multicast group. A cache fill session may be created upon a user device requesting a cache fill of a particular content item being transmitted (e.g., multicast or unicast), and may include information related to the user device and the particular content item. A QoS flow session may be created based on the initiation of a transmission to a user device, and may include information related to the QoS profile being enforced and the user device.

The servers 306/307 may communicate with a termination system 310 (e.g., the interface 104) that may ultimately deliver the content to a premises (e.g., the premises 102a), or to a gateway 311 (e.g., the gateway 111 or the interface 120), which can then supply content to various pieces of user equipment 312 (which may be the devices 112-117), such as a set-top box 312a, a computer 312b, the mobile device 116, or any other desired display device piece of user equipment. In some embodiments, the multicast server 307 (which may be a part of a CRAN network) may serve multiple termination systems 310 via one or more routers.

Other servers may be used as part of this delivery as well. For example, a quality of service (QoS) configuration manager 313 may be used to determine quality of service parameters for a given stream. As another example, a location resolution server 314 may contain geographic identification information for the various servers 306/307, termination system 310, packagers 303, and other components in the system, and may be configured to determine which device(s) may be closest geographically to a requesting user device. Location resolution device 314 may be configured to determine location information for a particular user device. For example, in some embodiments, location resolution device 314 may receive a location request identifying a particular user device, determine geographic information (e.g., latitude and longitude) for the user device, determine whether the user device may be on-network or off-network, and transmit the information to the session manager 309. A user device being on-network may include user devices connected via termination systems (e.g., termination system 310) of the content provider. A user device being off-network may include user devices (e.g., user equipment) connected via third party distribution networks that might not be under the management or the control of the session manager 309 and the multicast controller 308.

An entitlement resolution server 315 may be configured to validate a user device's entitlement to a particular content item. For example, in some embodiments, entitlement resolution server 315 may receive a validate entitlement request identifying a content item; determine whether a user device has a valid entitlement to the content item, based on user session information, content item information, and location information of the user device (e.g., if the user has paid their bill, subscribes to the requested service, is using an approved device, etc.); and transmit the information indicating the result of the determination to the session manager 309. Entitlements resolution server 315 may also be configured to validate a user device's license to a particular content item. For example, in some arrangements, entitlement resolution server 315 may receive a validate license request identifying a content item, determine whether a user device has a valid license to the content item, based on user session information and content item information, and transmit information indicating the result of the determination to a license resolution server 316.

License resolution server 316 may be configured to distribute licenses and/or distribute decryption and encryption keys. For example, in some embodiments, license resolution server 316 may distribute encryption keys to content packager 303 (or to license server/key manager 304. The license resolution server 316 may also receive a license request from a user device; transmit a request to the entitlement resolution server 315 to validate the license; and upon receiving an indication that the user device has a valid license, and transmit the license and one or more decryption keys to the user device.

A content server 317 may also be provided. The content server 317 may be the content server 106. The content server 317 may be one or more computing devices that may be configured to resolve requests for content. This content may be, for example, linear or video on demand movies, television programs, songs, text listings, etc. In some embodiments, the content server 317 may include software to validate (or initiate the validation of) user identities and entitlements, locate and retrieve (or initiate the locating and retrieval of) requested content, encrypt the content, and initiate delivery (e.g., streaming or transmitting via a series of content fragments) of the content to the requesting user and/or device.

The system may also include one or more off-net devices 318. As noted above, an off-net device 318 may be similar to the gateway 311, but can be a device connected to a third party network that may be part of a different network from the one of the termination system 310. For example, if the termination system 310 may be a land-based fiber optic and/or coaxial cable network, the off-net device 318 may be a wireless cellular or satellite network. Aside from the fact that the off-net device 318 may be part of a different network from the on-net devices (e.g., gateway 311), the off-net device 318 may behave in a similar manner as described herein for the gateway 311.

Figure 4:
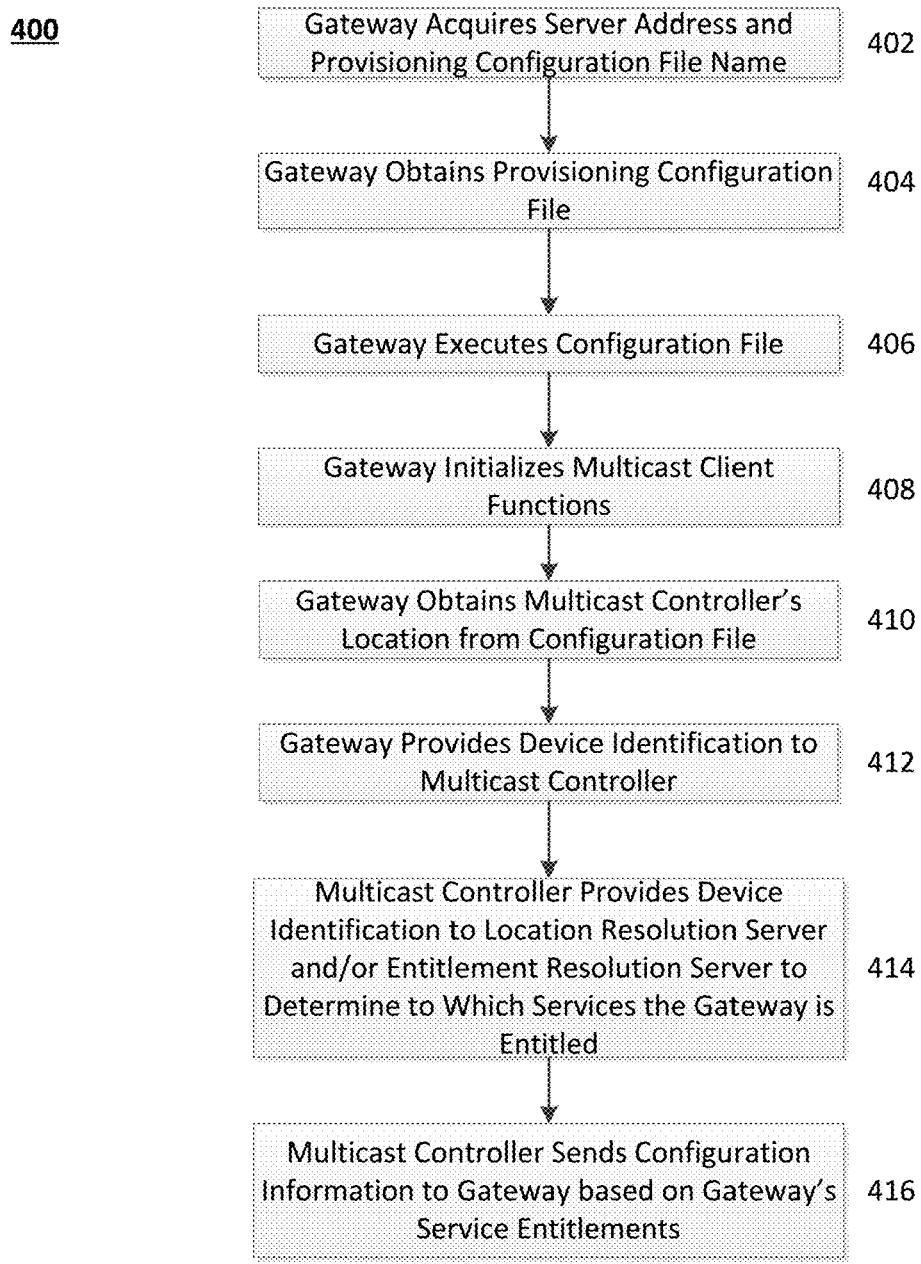
FIG. 4 illustrates an example flow diagram in accordance with aspects of the present disclosure.

FIG. 4 illustrates an example process 400 of provisioning a multicast client on the gateway 311. The multicast client may be software functionality that may be embedded and/or deployed in a latent state in the gateway 311. During provisioning of a gateway 311, the connection to the multicast controller 308 may be initialized, the gateway 311 may be provided with a network address, and the gateway 311 may receive a configuration file from a network server. The configuration file may contain service provisioning information. The provisioning information may include information identifying the level of service to which the user (or an associated device) may have subscribed, the list of services and channels that the user (or an associated device) may be permitted to receive, and the like. In order to configure services (e.g., multicast services), the gateway 311 may pass certain contents of the configuration file to the multicast controller 308, and the multicast controller 308 may pass certain identifiers back to the gateway 311. The provisioning allows the gateway 311 to communicate with the multicast controller 308 and obtain data service from the multicast controller 308. In one or more embodiments, the process illustrated in FIG. 4 and/or one or more steps thereof may be performed by one or more computing devices (e.g., components of the local office 103, the device 200, components of the system 300, and the like). In other embodiments, the process illustrated in FIG. 4 and/or one or more steps thereof may be embodied in computer-executable instructions that may be stored in a computer-readable medium, such as a non-transitory computer-readable memory. The steps in this flow diagram need not all be performed in the order specified and some steps may be omitted and/or changed in order.

At step 402, the gateway 311 (e.g., via a modem) may acquire server IP address information and the provisioning configuration file name. The gateway 311 may use known initializing and provisioning techniques to obtain a network address and establish a connection to components of system 300. For example, the data-over-cable service interface specifications (DOCSIS) may specify various protocols for managing the connection of a gateway 311 to the termination system 310. The gateway 311 may obtain an IP address in a known manner, and the customer premise equipment 312 (e.g., the devices 312a and 312b) connected to the gateway 311 may obtain an IP address, for example, by utilizing a networking protocol, such as Dynamic Host Configuration Protocol (DHCP). As part of a DHCP exchange, network 305 (e.g., network administrator) may provide gateway 311 with a Trivial File Transfer Protocol (TFTP) server IP address and a configuration file name. While DOCSIS, DHCP, and TFTP may be used in the above examples, any other network interface and/or protocol may be used according to the disclosed features herein.

At step 404, gateway 311 may obtain (e.g., download) the provisioning configuration file. For example, an embedded modem inside the gateway 311 may download the configuration file via TFTP. The configuration file may contain various instructions for the gateway 311. For example, these instructions may include TLV-11 Simple Network Management Protocol (SNMP) sets of Management Information Base (MIB) objects. According to some embodiments, the gateway 311 may include an internal data store of configuration elements that may be shared by an embedded modem, embedded router, and/or the multicast gateway client, any or all of which may be included in the gateway 311.

At step 406, the gateway 311 may execute the instruction contained in the configuration file.

At step 408, in response to executing the configuration file, the gateway 311 may initialize multicast gateway client functions. For example, a particular TLV-11 SNMP set in the configuration file may switch an mcgwEnable object to enable(1) from its default value of disable(2).

At step 410, after the multicast client may be initialized, the gateway 311 may obtain information from the configuration file, such as a location of a multicast controller. The location may be an HTTP URL for a particular multicast controller that may be used by the gateway 311 to retrieve any other configuration information that gateway 311 may need to complete the provisioning process. For example, a particular TLV-11 SNMP set may provide a web service URL location by setting the value of an mcgwControllerUrl object to a top level device configuration URL on the multicast controller 308. The top level device configuration URL may represent a web services interface on a master, centralized, fault-tolerant multicast controller 308 that may direct the gateway 311 to a particular multicast controller 308 that may be within the gateway 311's geographical area or proximity. In another example, an anycast IP address may be used for interfacing with the multicast controller 308, which may provide a universal configuration file for one or more gateways across a network associated with local office 103.

At step 412, gateway 311 may provide a gateway device identifier to the multicast controller 308. For example, gateway 311 may provide its MAC address to multicast controller 308's web services interface indicating that the gateway 311 may be checking in for the first time as a result of a reboot or for a DOCSIS re-registration.

At step 414, the controller 308 may provide the device identifier information to the location resolution server 314 and/or entitlement resolution server 315. The location resolution server 314 and/or entitlement resolution server 315 may then use the device identifier to determine a location of the gateway 311 and the services to which gateway 311 may be entitled. The location resolution server 314 and/or the entitlement resolution server 315 may then transmit this information to the multicast controller 308.

At step 416, the controller 308 may then respond to the gateway 311 by providing it with configuration information that may be based on the gateway 311's service entitlements and/or location. The configuration information may include a web service URL of the streamID resolution service, which may be specific to the gateway's network location. The streamID resolution service will be discussed below in more detail. The configuration information may also include a domain whitelist that may list objects (e.g., web objects) capable of being cached in the gateway 311. For example, a web proxy in the gateway 311 may have the capability to access content from the local office 103's (e.g., content from the content server 317) and might not have the capability to access content that may be sourced from a third party, such as a content streaming service and the like. In other embodiments, a third-party service may be connected to or otherwise associated with the local office 103 and thus may be included on this white list. The configuration information may include URL format definitions that may be used to parse fragment URLs. In these situations, the configuration information may include one or more rules for different packaging formats, such as smooth, HDS, HLS, etc. These formats may include one or more formatting parameters and/or formatting characteristics, such as TechnologyType, RegExPattern, ChannelIndex, StreamTypeIndex, Bitrate Index, and FragmentID Index. The configuration data may also include a cache purge period that may indicate to the gateway 311 when to purge the gateway 311's cache. In some cases, the cache may be a small specialized cache, such as a web cache. The cache may hold a predetermined amount of content, such as a predetermined amount of content (e.g., megabytes, gigabytes, 10 seconds, 30 seconds, 2 hours, etc.). The process 400 may repeat any step or may end after any step.

Figure 5:
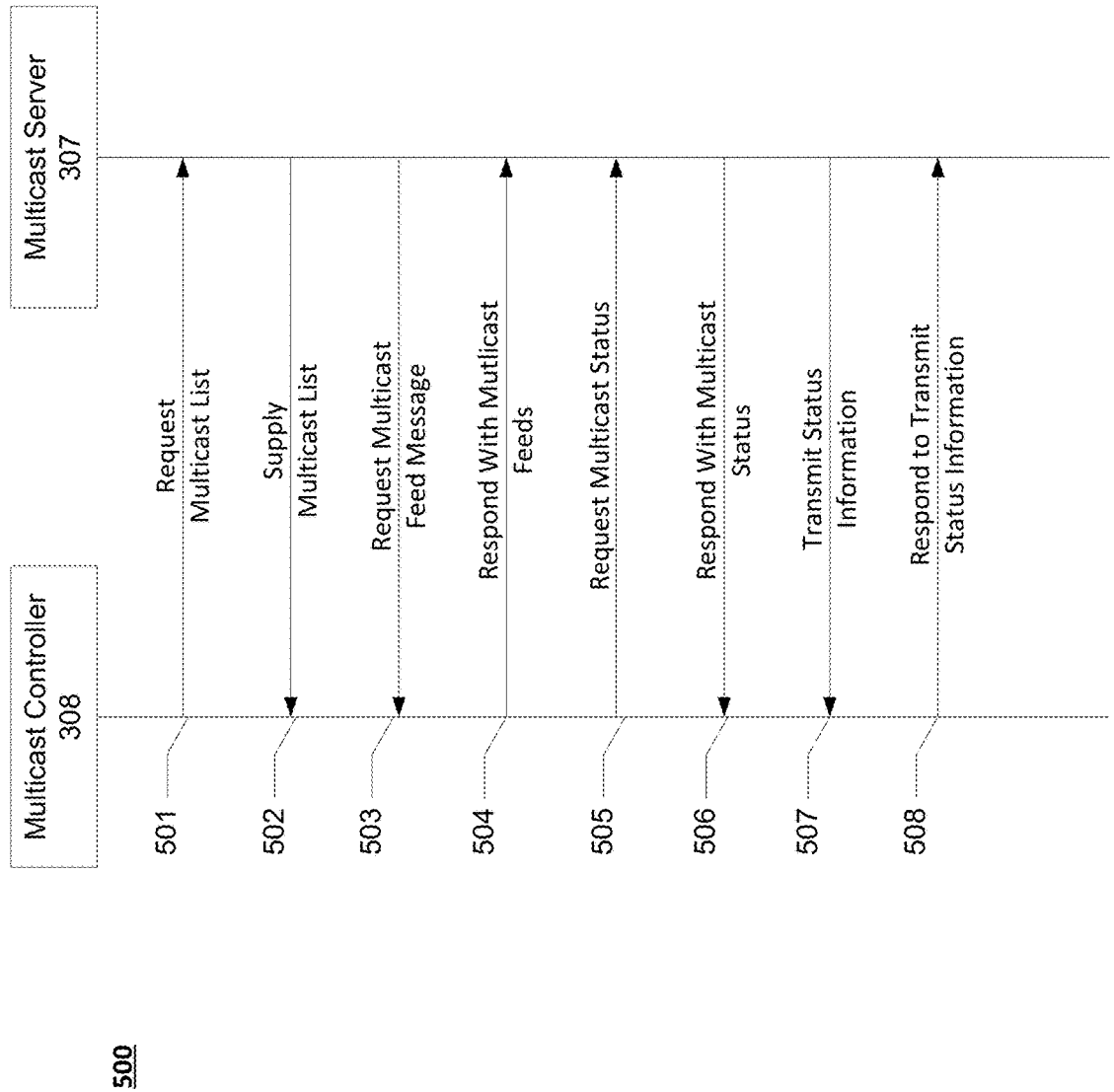
FIG. 5 illustrates an example signaling flow process in accordance with aspects of the present disclosure.

FIG. 5 illustrates an example signaling flow process 500 for maintaining and monitoring those multicast feeds by the multicast server 307. For example, steps 501-504 illustrate communication sequences to allow a multicast controller 308 and multicast server 307 to remain synchronized, for example, in terms of the groups and profiles that the server 307 may be serving. In step 501, the multicast controller 308 can issue a multicast list request to the multicast server 307. This request can be an HTTP GET request, and can include a Multicast Identifier, identifying a desired multicast list (e.g., a listing of multicast streams that the controller may be expecting the server 307 to be supplying). In one or more embodiments, the process illustrated in FIG. 5 and/or one or more steps thereof may be performed by one or more computing devices (e.g., components of the local office 103, the device 200, components of the system 300, and the like). In other embodiments, the process illustrated in FIG. 5 and/or one or more steps thereof may be embodied in computer-executable instructions that may be stored in a computer-readable medium, such as a non-transitory computer-readable memory. The steps in this flow diagram need not all be performed in the order specified and some steps may be omitted and/or changed in order.

In step 502, the multicast server 307 can respond with a list of the multicast streams that it may be currently offering. The response can include, for example, an ID identifying the multicast stream in the response, a Content Path parameter identifying the content itself (e.g., its name, the address of its source, etc.), and a List of Profile Levels parameter listing the profile levels for the content being offered by the multicast server. The response can also include a Server Multicast Source identifying the multicast server 307, and a List of Server Multicast Groups parameter, identifying the one or more multicast groups that contain each profile version of the content. For example, a given version of content may have a single profile, but that version may be offered in multiple multicast groups, so the List of Server Multicast Groups parameter may list those groups.

In step 503, the multicast server 307 may transmit a multicast feed request message to the multicast controller 308. The request may be another HTTP GET message, and may identify the server itself, as well as a Multicast ID listing the multicast streams that the server 307 may be currently transmitting.

In response, in step 504, the multicast controller 308 may transmit a response containing a Response Code identifying the type of response (success, failure, etc.), and a List of Multicast Info parameter, which can contain information for one or more multicast groups. The response can identify, for example, the Multicast ID, the Content Path of the content source, the List of Profile Levels for the content that the multicast server 307 may be providing, the Server Multicast Source, and a listing of the Multicast Groups that the multicast server 307 may be supporting. As noted above, each profile may be associated with multiple multicast groups, so this listing (one per profile) can identify those groups.

Steps 505-508 illustrate a communication sequence that allows the multicast server 307 and controller 308 to exchange status information for the various multicast streams being offered by the server 307. In step 505, the multicast controller 308 can issue a multicast status request to the multicast server 307. The request can be an HTTP GET request, and can include a Multicast ID parameter, identifying one or more multicast streams that the multicast controller 308 wishes to monitor.

In step 506, the multicast server 307 can respond, for example, with a Response Code identifying the success/failure of the request, and a List of Multicast Status value containing information for the one or more requested multicast streams identified in the controller 308's request. This list can identify the Status of a particular multicast stream, such as whether it may be active, as well as a Content Bit Rate parameter identifying the bit rate at which the particular content may be delivered in this stream.

Steps 505-506 may be initiated by the multicast controller 308. As an alternative, the multicast server 307 can voluntarily report its status information to the controller 308. Steps 507-508 illustrate this, in which the server 307 can transmit (step 507) its status information as an HTTP POST request, and the controller 308 can respond (step 508) with a Response Code to indicate a successful (or failed) delivery of the status information.

Figure 6:
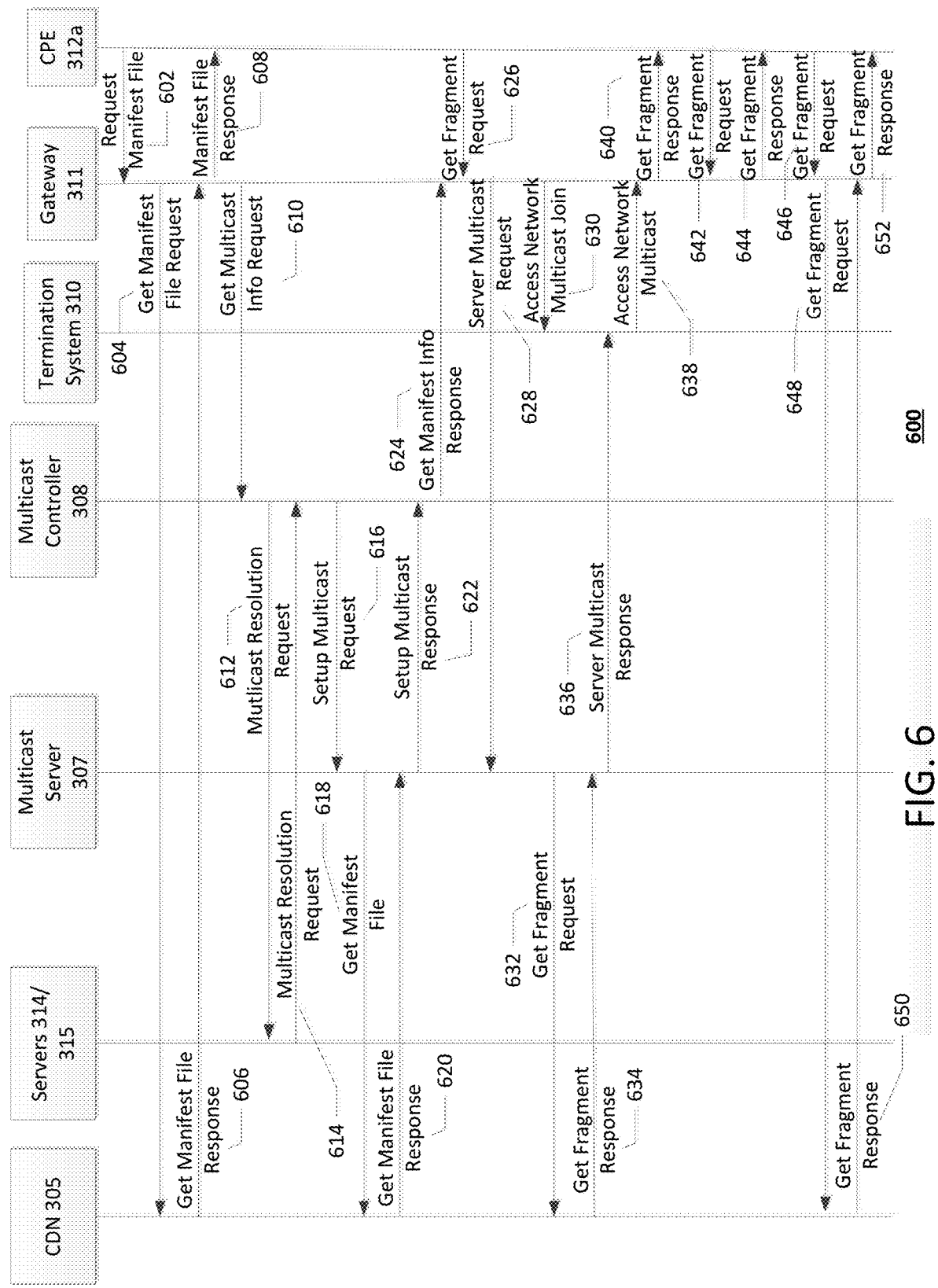
FIG. 6 illustrates example signaling flow process in accordance with aspects of the present disclosure.

FIG. 6 illustrates an example signal flow process 600 for setting up and joining a multicast stream feed. As shown in the signal flow process 600, the multicast controller 308 may communicate with the multicast server 307 to configure the multicast server 307 to begin multicasting a particular stream of video fragment files at a specified multicast source, group, and UDP port three-tuple. According to some aspects, the gateway 311 (e.g., via an internal multicast client) may interface with a multicast stream ID resolution service to identify the multicast server source and group number and port (e.g., UDP port number) that may map to a HTTP video fragment URL stream ID. In one or more embodiments, the process illustrated in FIG. 6 and/or one or more steps thereof may be performed by one or more computing devices (e.g., components of the local office 103, the device 200, components of the system 300, and the like). In other embodiments, the process illustrated in FIG. 6 and/or one or more steps thereof may be embodied in computer-executable instructions that may be stored in a computer-readable medium, such as a non-transitory computer-readable memory. The steps in this flow diagram need not all be performed in the order specified and some steps may be omitted and/or changed in order.

At step 602, the CPE 312 (e.g., user devices 312$a$ and 312$b$) may request a content item by transmitting a message to the gateway 311 requesting a manifest file for the requested content. The CPE 312 may communicate with one or more servers (e.g., the servers 314 or 315) to determine a location (e.g., URL) of the manifest file. The CPE 312 may then send this location along with the request to the gateway 311.

At step 604, the gateway 311 may then send a corresponding request for the manifest file to the CDN 305. This request may be in the form of an HTTP GET message. The gateway 311 may transmit the request to a location on CDN 305 (e.g., using an address identified in the request transmitted by the CPE 312). The request may include the manifest file's location (e.g., URL) and other information that may identify the manifest file, such as CDN Host and the manifest file's name. For example, the location may the location of the manifest file which may be located at a content server responsible for providing content, such as a server associated with one of the encoders 301/302 discussed above. The request may also identify the manifest file name being requested. A manifest file may include metadata information to help a multicast server 307 interpret the file's various profiles. Each piece of content may be available in a variety of different versions. For example, a movie might be available in a high definition version, a standard definition version, versions having different compression ratios, different encryption types, different required bitrates, etc. Each of those versions may have a profile, identifying a file location for that version, its necessary bitrate, encoder/decoder, resolution, etc., and the manifest file may inform the multicast server 307 as to the formatting of the content's profile. The manifest file may identify a plurality of profile levels, each level identifying an encryption, compression, or resolution level that may be suitable for delivery given a predetermined bitrate. For example, the file may identify two different profile levels, one for high bitrate use and one for low bitrate use, and these levels may identify different types of compression suitable for the available bitrates (e.g., a low bitrate level could use a more lossy level of encryption because the content files may be smaller).

At step 606, the CDN 305 receives the request for the manifest file. The CDN 305 may then use the information transmitted in the request, such as the URL or CDN Host, to obtain the manifest file. In some embodiments, CDN 305 may retrieve the manifest file from a web cache or web server via one or more routers. According to some aspects, if the CDN 305 cannot retrieve the manifest file (e.g., due to a cache miss at the CDN 305 that may be caused by a network adjustment), the CDN 305 can retrieve the manifest file from the content packager 303. After locating and retrieving the manifest file, CDN 305 may then transmit the manifest file to the gateway 311 in a response message. At step 608, the gateway 311 may then transmit the manifest file to the CPE 312. It may be noted that the gateway may communicate with a plurality of CPEs (e.g., CPE 312a and 312b). Thus the signal flow process 600 may occur simultaneously or near simultaneously for one or more CPEs 312 for the same or similarly requested content.

At step 610, the gateway 311 may discover from the regular expression configured at provisioning time (e.g., the process 400) the multicast eligible manifest file URL. Gateway 311 may then initiate signaling to the multicast controller 308 and may transmit a request message to multicast controller 308 requesting multicast information. This message may include a gateway device ID or a CPE device ID and/or the manifest file location (e.g., URL and/or file name). In some embodiments, the gateway may already contain a cached response that may be still valid, and may transmit content to CPE 312 (this will be described below).

At step 612, the multicast controller 308 may transmit a multicast resolution request to the entitlement resolution server 315 requesting information describing which multicast server and/or multicast stream the requested content may be located. This message may include the gateway device ID or the CPE device ID and the manifest file location and/or name.

At step 614, the entitlement server 315 may match (e.g., map or correlate) the gateway (or CPE) device ID to an account ID and/or location ID. The entitlement server 315 may then use the manifest URL to determine a stream ID from a pre-configured pattern or list that may contain URLs linked to corresponding steam IDs. Entitlement server 315 may then find one or more multicast servers 307 (and their corresponding IDs) that may serve the location of the gateway 311 and/or the identified stream ID. Then entitlement server 315 may then transmit to the multicast controller 308 a response to the multicast resolution request that may include a list of the one or more multicast server IDs. These multicast server IDs may identify which multicast servers the content may be located.

At step 616, based on the received multicast server ID and/or stream ID, the multicast controller 308 may select a multicast server and may transmit a multicast setup request to a selected multicast server 307. This message may be in the form of an HTTP POST message, which may have a message body that may include a variety of parameters. For example, the message may include a Multicast ID parameter, which may be a unique identifier for a particular piece of content. According to some aspects, the request can include a content manifest file name parameter, which may inform the multicast server 307 as to the type of formatting associated with the content's profile. The message may also include a list of profile indexes/levels that may identify multicast eligible content as well as characters and/or parameters of that content (e.g., bitrate, resolution, codec compatibility, etc.) The message may also include a multicast location identification (e.g., multicast source and groups addresses, multicast IDs, ports, etc.). The message may include a List of Profile Levels parameter, which can specify the profiles in the manifest file that the multicast server should deliver. For example, the multicast controller 308 may determine that a particular multicast server should offer 3 versions of a particular video program: one high bitrate version, one medium, and one low bitrate version. The List of Profile Levels parameter may identify these three profile levels to the multicast server. The message may include a Server Multicast Source parameter and a List of Server Multicast Groups parameter. These parameters may identify, for each profile, a corresponding multicast source (e.g., an address of the multicast server 307) and group (e.g., name of a multicast group).

At step 618, the multicast server 307 can proceed to prepare a multicast stream for the content by sending a request for the manifest file to the CDN 305. The request may identify the manifest file name being requested. This request may be a HTTP GET request. The multicast server 307 can transmit this request to a desired location on the CDN 305 (e.g., using an address identified in the content manifest file name parameter). For example, the manifest file may be located at a content server responsible for the content, such as a server associated with one of the encoders 301/302. The multicast server 307 may then send the request to that content server location.

At step 620, the CDN 305 receives the request for the manifest file. The CDN 305 may then use the information transmitted in the request, such as the URL or CDN Host, to obtain the manifest file. In some embodiments, the CDN 305 may retrieve the manifest file from a web cache or web server via one or more routers. According to some aspects, if the CDN 305 cannot retrieve the manifest file (e.g., due to a cache miss that may be caused by a network adjustment), the CDN 305 can retrieve the manifest file from the content packager 303. After locating and retrieving the manifest file, the CDN 305 may transmit the manifest file to the multicast server 307 in a response message.

At step 622, the multicast server 307 may compare one or more parameters with the available profiles in the manifest file, and select one or more profiles for the one or more versions of the requested content based whether the one or more parameters match or correspond with the available profiles. The multicast server 307 may make these one or more versions of the requested content available to user devices. For example, the multicast server 307 can select one or more versions of the requested content to multicast based on characteristics and/or parameters transmitted in or associated with the requests received from CPEs 312. The multicast server 307 may then transmit to the multicast controller 308 a response to the setup response transmitted in step 616. The response transmitted by the multicast server 307 may include the list of selected profile name(s) indicating the one or more versions of the requested content that the multicast server 307 may make available for transmission.

At step 624, the multicast controller 308 may respond to the request message sent by the gateway 311 at step 610 requesting multicast information by sending a response message to the gateway 311. The response message transmitted by the multicast controller 308 may include information such as a list of multicast IDs that identify the different multicasts stream available, the list of profile names that may include the one or more versions of the content that may be made available for multicast, the multicast source and group address, and/or a multicast port number. According to some aspects, the gateway 311 may then cache this information in a local cache or other memory.

At step 626, the CPE 312 may request access to content (e.g., the requested content at step 602), and may transmit this request to the gateway 311. This request may be in the form of a HTTP GET request. In this request, the CPE 312 may request a fragment of content and may identify a fragment location (such as a URL or a CDN Host) on which the fragment may be stored, a profile name of the fragment, a fragment number or ID, etc. A fragment of content may be of any length and/or size, such as a 1 or 2 second fragment or 5 minute fragment.

At step 628, the gateway 311 may inspect any information it may have stored locally and/or have access to obtain the requested content fragment. The gateway 311 may determine identification/location information for the selected fragment, such as a multicast ID, profile name, multicast source and group, and/or multicast port number. According to some aspects, if the gateway 311 does not have a cached version of the requested fragment (or otherwise not have access to an associated memory storing the requested fragment), then the gateway 311 may request the content associated with the requested content fragment from the multicast server 307. Gateway 311 may then transmit to the multicast server 307 a request that may include any of the identification/location information. According to some aspects, the gateway 311 may have one or more of the requested content fragments stored in a local cache (or other memory). In this case, the gateway 311 may transmit (e.g., from a local cache) the one or more content fragments to the CPE 312 (this will be described below).

At step 630, the gateway 311 may transmit a session join message to the termination system 310. This session join message may be an Internet Group Management Protocol (IGMP) Join message and may identify a multicast server source and group to which the gateway 311 may be joined. This source and group may be selected from the information transmitted to gateway 311 in the response to the request for multicast information (e.g., step 624). According to some aspects, the IGMP protocol may be used to support multicast session or multicast transmission between the termination system 310 and a gateway 311. According to some aspects, the multicast session or multicast transmission may be any protocol or standard, such as the PacketCable Multimedia (PCMM) standard.

At step 632, the multicast server 307 may request the requested content fragment from the CDN 305 by identifying the source and group number.

At step 634, the CDN 305 may locate the fragment using the source and group number and may send the fragment back to the multicast server 307 in a response message. According to some aspects, if the CDN 305 cannot retrieve the fragment (e.g., due to a cache miss at the CDN 305 that may be caused by a network adjustment), the CDN 305 can retrieve the fragment from the content packager 303.

At step 636, after receiving the content fragment(s) associated with the multicast source and group number, the multicast server 307 may embed the fragments into a discrete web object multicast protocol (DWOMP), and may transmit information such as a list of fragment locations (e.g., URLs) and other fragment data to the termination system 310. Other protocols may also be used. The DWOMP protocol may be configured to enable devices receiving a multicast transmission conforming to the DWOMP protocol to reassemble the data objects (e.g., one or more content fragments) at the receiving devices (e.g., gateway 311 or CPE 312). For example, a transmission conforming to the DWOMP protocol may include content packets and attribute packets. The contents of the attribute packets and/or content packets enable receiving devices to reassemble a content fragment that may be divided among the content packets. Additionally, in some arrangements, the DWOMP protocol may be configured to enable devices receiving a multicast transmission conforming to the DWOMP protocol to store the data objects (e.g., one or more content fragments) at the receiving devices based on one or more attributes included in the multicast transmission. Further, the DWOMP protocol allows for each data object to be self-describing such that the content and attribute packets for a particular data object may provide the name for the reassembled data object so a receiving device can store and/or retrieve the reassembled data object when needed. Multicast server 307 may transmit this information to termination system 310 via one or more routers. For example, at step 630, the termination system 310 may send a Protocol-Independent Multicast (PIM) join request or an Internet Group Management Protocol (IGMP) join request to one or more routers, and at step 636, these one or more routers may then transmit the fragment information to the termination system 310.

At step 638, the termination system 310 may then transmit a response to the access network request transmitted by gateway 311 at step 630. This response may include the fragment information (e.g., the list of fragment URLs and the DWOMP embedded data). This information may be stored one or more caches at gateway 311 or in other memory. At step 640, the gateway 311 may then respond to the fragment requested by the CPE 312 at step 626 by sending the requested fragment to the CPE 312.

At step 642, the CPE 312 may request another fragment of content from the gateway 311.

At step 644, the gateway 311 may check its cache (or other memory) to determine whether the requested fragment may be stored in the cache (or other memory). The gateway 311 may determine that the requested fragment may be stored in the cache or other memory and may send the fragment to the CPE 312.

At step 646, the CPE 312 may request another content fragment from the gateway 311.

At step 648, after determining that the requested fragment might not be stored in a cache associated with the gateway 311, or if there may be a cache miss at the gateway 311 for the requested fragment, the gateway 311 may forward the fragment request to the CDN 305 for unicast delivery. The CDN 305 may obtain the unicast fragment from one or more content servers (e.g., the streaming server 306). According to some aspects, if the CDN 305 cannot retrieve the fragment (e.g., due to a cache miss at the CDN 305 that may be caused by a network adjustment), the CDN 305 can retrieve the fragment from the content packager 303.

At step 650, CDN 305 may transmit the unicast fragment to the gateway 311.

At step 652, the gateway 311 may transmit the unicast packet to the CPE 312. The process 600 may repeat any step or may end after any step.

Figure 7:
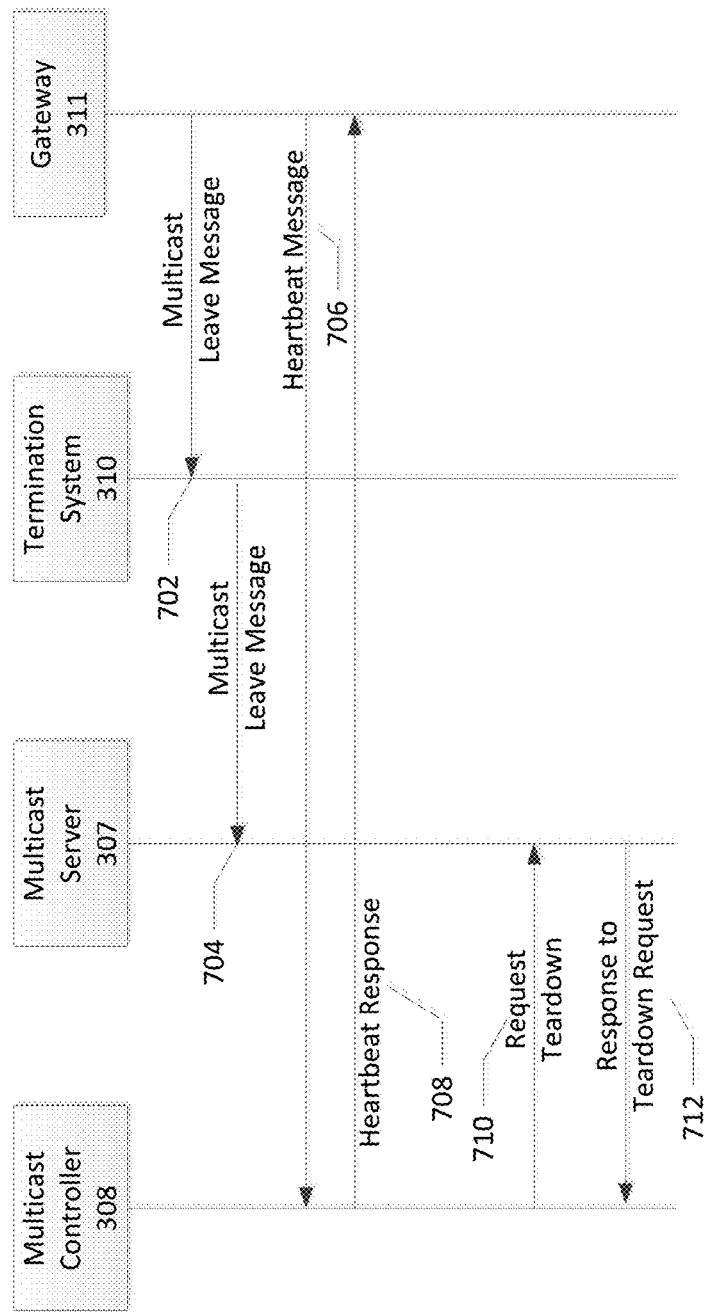
FIG. 7 illustrates example signaling flow process in accordance with aspects of the present disclosure.

FIG. 7 illustrates an example signal flow process 700 for stopping or tearing down a multicast stream or feed. The signal flow process 700 may be performed at any time, such as after one or more CPEs 312 stops requesting content. In such scenarios, the home gateway 311 may instruct the multicast controller 308 or one or more multicast servers 307 to tear down one or more multicast streams based on the source, group, and or UDP port identifiers of the multicast streams. In one or more embodiments, the process illustrated in FIG. 7 and/or one or more steps thereof may be performed by one or more computing devices (e.g., components of the local office 103, the device 200, components of the system 300, and the like). In other embodiments, the process illustrated in FIG. 7 and/or one or more steps thereof may be embodied in computer-executable instructions that may be stored in a computer-readable medium, such as a non-transitory computer-readable memory. The steps in this flow diagram need not all be performed in the order specified and some steps may be omitted and/or changed in order.

At step 702, the gateway 311 may determine that a multicast stream may no longer be needed. For example, the gateway 311 may determine that a multicast stream might not be need if gateway 311 receives less than a threshold number of requests from one or more CPEs 312 for content fragments (e.g., of a content item or program) associated with the multicast stream. For example, one or more CPEs 312 may request different content (e.g., changes channel to a different channel), or one or more CPEs 312 may cease requesting content (e.g., turns the power off). According to some aspects the threshold may be set by the local office 103, the multicast controller 308, or any other device or entity. After determining that a multicast stream may no longer needed, the gateway 311 can transmit a multicast leave message to the termination system 310. This message can identify the server multicast source, group, and/or port parameters, which identify the multicast stream to tear down.

At step 704, the termination system 310 may send a leave request to one or more routers, which may then send the leave request to the multicast server 307. For example, the termination system 310 may determine to leave a multicast server or stream if the termination system 310 receives less than a threshold number of requests from one or more gateways 311 to join or stay connected to the corresponding multicast server or stream. In some situations, the termination system 310 may transmit a Protocol-Independent Multicast (PIM) leave message to a router. In some embodiments, the termination system 310 (and/or router) may send a PIM leave message to the multicast server 3070 that may be transmitting the multicast stream. In other embodiments, the termination system 310 (and/or router) might not send a PIM leave to the multicast server 317 that may be transmitting the multicast stream.

At step 706, the gateway 311 may send status updates to the multicast controller 308 that may indicate that the gateway 311 or associated CPEs 312 may be still accessing the multicast stream. These status updates may include the gateway (or CPE) device ID(s), the multicast information and/or ID(s), and the multicast status (e.g., how many devices are being streamed to, the profile of the stream(s), etc.). For example, the gateway 311 may periodically send a message (e.g., a heartbeat message) to confirm or monitor that the requesting device may be still accessing the multicasted content from a multicast stream. According to some aspects, if no heartbeat message may be received from the requesting device for a predetermined amount of time (e.g., 10 seconds, 5 minutes, etc.), the multicast controller 308 can automatically terminate a multicast session or may decrease a group member count by one to remove the requesting device from the membership list, which may result in termination of the multicast session if there may be insufficient remaining subscribers to justify the group (e.g., below a threshold number).

At step 708, the multicast controller 308 may transmit a response to the gateway 311 confirming that the status update was received.

At step 710, if the multicast controller 308 receives less than a threshold number of requests from one or more gateways 311 indicating that the gateways 311 may be still accessing one or more multicast streams and/or servers, the multicast controller 308 may transmit a teardown multicast request to one or more multicast servers 307 (e.g., the multicast servers 307 providing the corresponding multicasted content). The teardown request may include information such as the multicast server ID to tear down, a list of multicast stream IDs to tear down, and any reasons for tearing down (e.g., a reason code).

At step 712, the multicast server 307 may respond to and acknowledge this teardown request by sending an acknowledgement response to the multicast controller 308. The multicast server 307 may then tear down the multicast stream. The process 700 may repeat any step or may end after any step.

Figure 8:
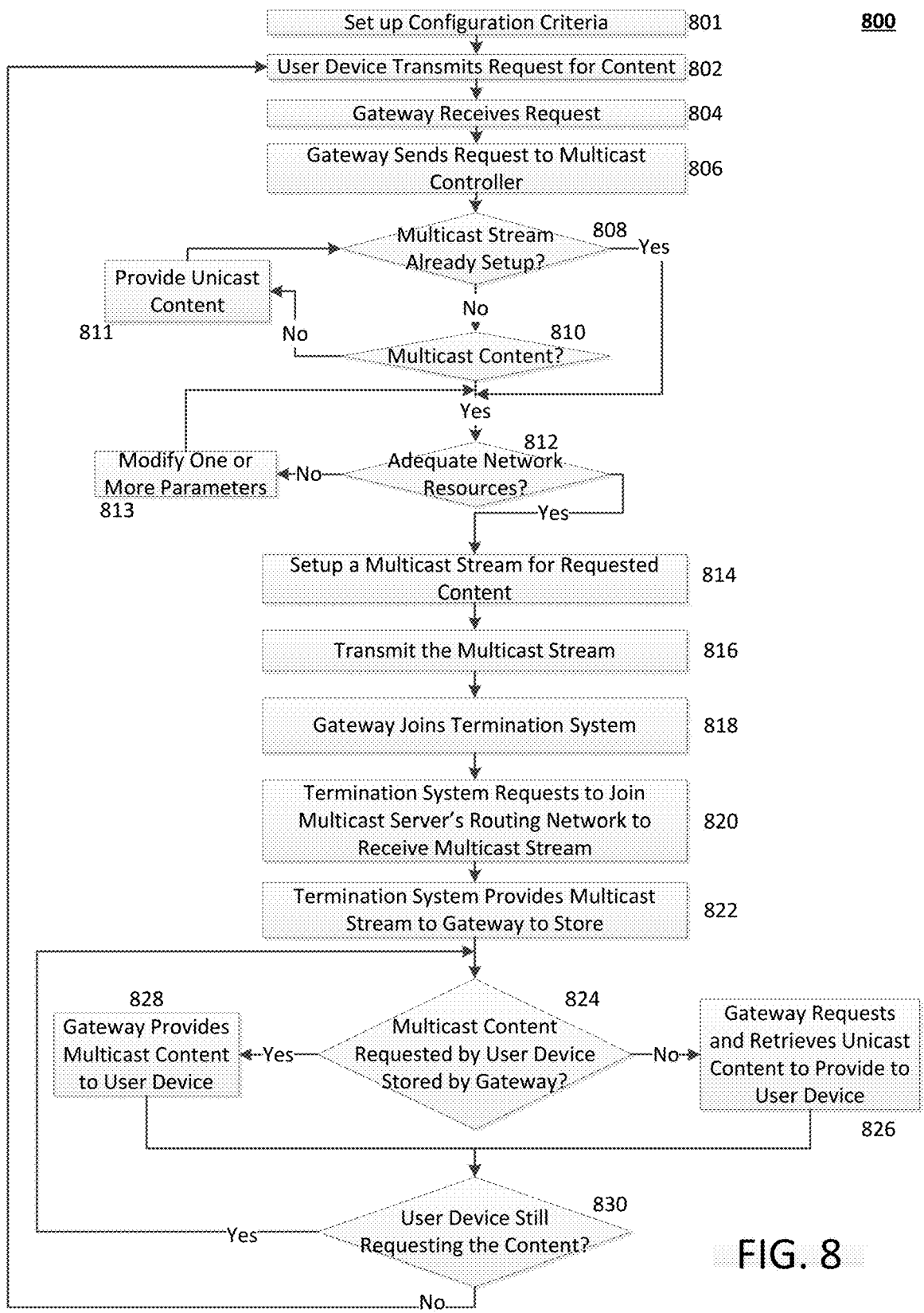
FIG. 8 illustrates an example flow diagram in accordance with aspects of the present disclosure.

FIG. 8 illustrates an example process 800 of transmitting a multicast stream to one or more user devices. Any of the steps of process 800 may be executed or performed via one or more steps described the in processes described in FIGS. 3-7. In one or more embodiments, the process illustrated in FIG. 8 and/or one or more steps thereof may be performed by one or more computing devices (e.g., components of the local office 103, the device 200, components of the system 300, and the like). In other embodiments, the process illustrated in FIG. 8 and/or one or more steps thereof may be embodied in computer-executable instructions that may be stored in a computer-readable medium, such as a non-transitory computer-readable memory. The steps in this flow diagram need not all be performed in the order specified and some steps may be omitted and/or changed in order, and they are not all necessarily performed by the same device, as will be apparent from the description below.

Process 800 may begin at step 801. At step 801, the multicast controller 308 may set up or configure criteria that may be used by the multicast controller 308 to determine whether to multicast or unicast content and whether to adjust one or more content parameters of the content before transmitting to the CPE device 312. The criteria may include a threshold number of requesting CPE devices 312 that may be required to request content before the multicast controller 308 determines to transmit that requested content in a multicast stream (e.g., instead of a unicast) to those requesting CPE devices 312. The criteria may also include criteria associated with network resources, such as available bandwidth, etc. For example, the multicast controller 308 may use the network resources criteria to determine whether to adjust one or more of the content parameters, which may utilize the available network resources in a more optimal manner. These content parameters may be any parameters related to content, such as bitrate, resolution, CODEC, content format (e.g., screen size, operating system compatibility, file type), and the like. According to some aspects, the multicast controller 308 may generate a data structure that may include these criteria. For example, the data structure may be in the form of a table or some other structured format, such as shown below.

TABLE 1

| Criteria | Result |
| --- | --- |
| Bandwidth ≥ X and U ≥ T | Multicast + Requested Content Parameter(s) |
| Bandwidth < X and U ≥ T | Multicast + Adjust Content Parameter(s) |
| Bandwidth ≥ X and U < T | Unicast + Requested Content Parameter(s) |
| Bandwidth < X and U < T | Unicast + Adjusted Content Parameter(s) |

Using the above Table 1 example data structure, the multicast controller 308 may determine to multicast the requested content formatted with the requested content parameters if the available network resources sources (shown in this example as bandwidth) satisfy (e.g., meet) a threshold value (shown as "X") and the number of users ("U") requesting that content formatted with those content parameters satisfies a threshold number of users ("T"). The multicast controller 308 may determine to multicast the requested content formatted with adjusted content parameters (e.g., having a reduced quality from what was originally requested) if the available network resources sources (shown in this example as bandwidth) is below (e.g., not satisfy, not meet, etc.) a threshold value (shown as "X") and the number of users ("U") requesting that content formatted with those content parameters satisfies a threshold number of users ("T"). The multicast controller 308 may determine to unicast the requested content formatted with the requested content parameters if the available network resources sources (shown in this example as bandwidth) satisfy a threshold value (shown as "X") and the number of users ("U") requesting that content formatted with those content parameters is below a threshold number of users ("T"). The multicast controller 308 may determine to unicast the requested content formatted with adjusted content parameters if the available network resources sources (shown in this example as bandwidth) is below a threshold value (shown as "X") and the number of users ("U") requesting that content formatted with those content parameters is below a threshold number of users ("T"). Other criteria, such geographical area associated with a request for content or a device sending a request for content, and the like may also be used. Further examples of the multicast controller 308 using this criteria will be discussed below in more detail At step 802, a CPE device 312 may transmit to an associated gateway 311 a request for content (e.g., a selected program). For example, a user of user device (e.g., a display device, a computer, a set-top box, a mobile device, etc.) may decide to access a program, and may use an input device associated with the CPE 312 to select the program. This can occur, for example, when a user views an electronic program guide listing of available video programs, and chooses one to watch.

At step 804, the gateway 311 may receive this request.

At step 806, the gateway 311 (e.g., via an associated termination system 310) may send a request to a multicast controller 308 requesting the location information for a multicast stream that contains the requested content. The location information may be a multicast IP address, stream ID, multicast source number, multicast group number, and/or multicast port number, etc. It may be noted that one or more gateways 311 and one or more CPEs 312 may transmit and receive information via one termination system 310.

At step 808, the multicast controller 308 may determine whether the multicast controller 308 has already instructed one or more multicast servers 307 to setup or transmit a multicast stream for the requested content. The multicast controller 308 may use the received location information (multicast IP address, stream ID, multicast source number, multicast group number, and/or multicast port number, etc.) to determine whether a multicast stream may already be setup and/or may be currently transmitted to one or more devices. If the multicast server 307 determines that the multicast stream may have already been setup and/or may be currently transmitted to one or more termination systems 310 and/or gateways 311, then process 800 may continue to step 812. If the multicast server 307 determines that the multicast stream might not have already been setup and/or might not be currently transmitted to one or more termination systems 310 and/or gateways 311, then process 800 may continue to step 810.

At step 810, the multicast controller 308 may determine whether the requested content should be multicasted (in which the process 300 may continue to step 812) or unicasted (in which the process 300 may continue to step 811). The multicast controller 308 may use the data structure configured at step 801 to make this determination. For example, the multicast controller 308 may make this determination using one or more of the following factors: the number of CPEs 312 made requests for content and/or one or more parameters and/or characteristics associated with the content requests made by the CPEs 312 (and/or gateways 311). These parameters and characteristics may include the requested bitrate (or bitrate capability of a requesting device—from low to high), the requested resolution (or resolution capability of a requesting device—from low resolution/low definition to high resolution/high definition), the requested CODEC(s), the number of requests for a particular type of content item, the elapsed time associated with a content request, the streaming format, the location of a user device, properties of the associated gateway device 311, properties of the termination system 310 transmitting/receiving the content request, the network bandwidth usage/availability, the network bandwidth limitations/capability, the content format (e.g., screen size, operating system compatibility, file type), and the like.

According to some aspects, these content parameters and characteristics may be transmitted along with the requests for content transmitted by the CPEs 312 and/or the gateways 311. For example, these requests may be in an HTTP format (e.g., GET, URL, etc.) and may carry one or more content characteristics or parameters as well as other information. In some cases, a request (e.g., a message) header may comprise content characteristics or parameters. After a CPE 312 makes a request, a gateway 311 may receive these requests and may proxy these requests (e.g., HTTP requests) to determine the ones that may be related to local office 103. If gateway 311 determines that the requests may be related to the local office 103 (e.g., coming from a user device associated and/or integrated with local office 103 or one of local office 103's networks such as network 100), then the gateway 311 may inspect the requests and determine the information included in the requests (e.g., one or more parameters and/or characteristics associated with the content requests). The gateway 311 may then transmit this information to the multicast controller 308 (e.g., via a termination system 310 and/or one or more routers). In some situations, the gateway 311 may ignore or might not process requests that may be related to entities other than the local office 103 (e.g., requests for content from a third party device that might not be associated and/or integrated with local office 103 or one of local office 103's networks such as network 100). In some situations, the gateway 311 may determine that these third party devices may be associated or otherwise integrated with the local office 103 or one of the local office 103's networks. In such situations, gateway 311 may inspect the requests and may pass any information included in the requests to the multicast controller 308.

According to some aspects, the multicast controller 308 may determine whether to multicast the content by grouping the requests received from CPEs 312 in groups according to common characteristics, and then comparing the number of requests (or their associated CPE device 112) in each group to a threshold number to determine whether to multicast or unicast the content to those devices in that group. For example, the multicast controller 308 may instruct a multicast server 307 to setup/transmit a multicast stream for requested content associated with one or more of the higher ranked groups (e.g., groups containing a higher number of requests that have one or more common characteristics). According to some aspects, these requests may be grouped and/or analyzed on a termination system level or a service group level. For example, one termination system 310 may serve 250 gateways, and a multicast server 307 may send a multicast stream to this termination system 310 to provide multicasted content to any of those 250 gateways. Thus, in this case, the multicast controller 308 may determine whether to multicast content based the requests coming from the 250 gateways for that one termination system 310.

In one example, a termination system 310 may interface, service, and/or otherwise be connected to 250 gateway devices 311 (e.g., modems), and these gateway devices 311 may be located in Boston. Further, the nightly news may be showing on a first channel, and a Boston Celtics game may be scheduled to air after the nightly news on the same channel. Further, the configuration data structure (e.g., step 801) may require that the multicast controller 308 receive a predetermined threshold amount (e.g., 40 device requests for the same content) of requests be received from the gateway devices 311 connected to a termination system 310 so that the multicast controller 308 may instruct a multicast server 307 to setup and transmit a multicast stream for that content. According to some aspects the threshold (and any other threshold amount referred to herein) may be set or configured by the local office 103, the multicast controller 308, or any other device or entity. According to some aspects, if a low number of CPE 312 or gateway devices 311 may be accessing the nightly news (e.g., 5 gateways or 5 user devices), then the multicast controller 308 may determine that a multicast stream might not be needed for the nightly news, and the streaming server 306 may then unicast the nightly news to these 5 gateways or 5 user devices. If, for example, 60 gateway devices request the Boston Celtics game that may be shown on the same channel as the nightly news, the multicast controller 308 may determine that a multicast stream may be needed for the Celtics game, and may instruct a multicast server 307 interfacing with one or more termination systems 310 servicing those requesting gateways 311 to setup and transmit a multicast stream of the Celtics game.

In another example, the configuration data structure (e.g., step 801) may indicate that the threshold amount for setting up a multicast stream may be 40 devices per termination system. In this example, if 50 devices connected to a first termination system 310 may be requesting the Celtics game, and 55 devices connected to a second termination system 310 may be requesting the Celtics game, then the multicast controller 308 may instruct a multicast server 307 servicing both the first and second termination systems to multicast the game to these two termination systems. According to some aspects, this situation may occur when the first and second termination systems may be located in a close proximity to each other. In such a situation, the multicast server 307 that services the first and second termination systems may serve a particular geographical area/location of a network. According to some aspects, if different multicast servers may be servicing these two termination systems, then the multicast controller 308 may instruct more than one multicast servers 307 to setup and transmit a multicast to each of these termination systems (e.g., if one multicast server 307 serves one termination system and another multicast server 307 serves the other termination system).

In another example, the configuration data structure (e.g., step 801) may indicate that the threshold amount may be 40 requests for the same content per termination system 310. Out of the 250 gateways 311 connected to a termination system, if 100 devices request a first program, 50 devices request a second program, 40 devices request a third program, and 10 devices request a fourth program (the remaining 50 devices may be requesting other programs or no content), then the multicast controller 308 may instruct a multicast server 307 to multicast the first program, the second program, and the third program. Thus, the 100 devices requesting the first program, the 50 devices requesting the second program, and the 40 devices requesting the third program may receive their respective program in a multicast stream. However, because the threshold may be set at 40 requests for the same termination system 310, the fourth program may be unicasted to the 10 devices requesting the fourth program.

In another example, the configuration data structure (e.g., step 801) may indicate that the threshold amount may be 40 requests for the same content per termination system 310. Out of the 250 gateways 311 connected to a termination system, it 100 devices request a program at a bitrate of 20 Mbit/s and 35 devices requests the same program at a bitrate of 3.5 Mbit/s, then the multicast controller 308 may instruct a multicast server 307 to multicast the program at the 20 Mbit/s rate. Thus, the 100 devices requesting the program at the bitrate of 20 Mbit/s may receive this multicast stream. However, because the threshold may be set at 40 requests for the same content per termination system, the program may be unicasted at 3.5 Mbit/s to the 35 devices requesting the program at the bitrate of 3.5 Mbit/s. If, for example, at a later time, an additional 5 devices request the program at 3.5 Mbit/s, and the 35 initial devices may be still accessing/requesting the program at 3.5 Mbit/s, the multicast controller 308 may determine that a multicast may need to be setup and may instruct a multicast server 307 to multicast the program at a bitrate of 3.5 Mbit/s to these 40 devices. Thus, two or more multicast streams may be transmitted at different bitrates for the same program. These multicast streams may be transmitted by one multicast server 307 or a plurality of multicast servers 307.

In another example, the configuration data structure (e.g., step 801) may indicate that the threshold amount may be 40 requests for the same content per termination system 310, and out of the 250 gateways 311 connected to a termination system, 100 devices request a program with a bitrate of 20 Mbit/s. Out of those 100 devices, 35 may be for a first codec, 15 for a second codec, and 50 for a third codec. Based on the threshold, the multicast controller 308 may determine to multicast (e.g., instruct one or more multicast servers 307 to setup multicast stream(s)) the program at a bitrate of 20 Mbit/s for the third codec, and may determine not to multicast the program at a bitrate of 20 Mbit/s for the first codec or second codec. Thus, unicast streams may be transmitted for the program at a bitrate of 20 Mbit/s for the first codec or second codec.

In another example, the configuration data structure (e.g., step 801) may indicate that the threshold amount may be 40 requests for the same content per termination system 310, and out of the 250 gateways 311 connected to a termination system, 100 devices request a program with a bitrate of 20 Mbit/s. Out of those 100 devices, 35 may be for a first codec, 15 for a second codec, and 50 for a third codec. Out of the 50 requests for 20 Mbit/s and the third codec, 40 requests may be for 720p resolution (e.g., 1280×720) and 10 requests may be for 480i resolution. Based on the threshold, the multicast controller 308 may determine to multicast (e.g., instruct one or more multicast servers 307 to setup multicast stream(s)) the program at a bitrate of 20 Mbit/s for the third codec at a resolution of 720p, and may determine not to multicast the program at a bitrate of 20 Mbit/s for the first codec or second codec and may determine not to multicast the program at a bitrate of 20 Mbit/sec for the third codec at a resolution of 480i. Thus, unicast streams may be transmitted for the program at a bitrate of 20 Mbit/s for the first codec or second codec and for the program at a bitrate of 20 Mbit/sec for the third codec at a resolution of 480i.

In another example, the configuration data structure (e.g., step 801) may indicate that the threshold amount may be 20 requests for the same content per termination system 310, and out of the 250 gateways 311 connected to a termination system, 100 devices request a program with a bitrate of 20 Mbit/s. Out of those 100 devices, 45 may be for a first codec, 50 for a second codec, and 5 for a third codec. Out of the 45 requests for 20 Mbit/s and the first codec, 43 requests may be for 720p resolution (e.g., 1280×720) and 2 requests may be for 480i resolution. Out of the 43 requests for 20 Mbit/s at the first codec and 720p resolution, 20 requests may be for the program in a first format (e.g., HLS) and 23 requests may be for the program in a second format (e.g., HTS). Further, out of the 50 requests for 20 Mbit/s and the second codec, 47 requests may be for 720p resolution (e.g., 1280×720) and 3 requests may be for 480i resolution. Out of the 47 requests for 20 Mbit/s at the second codec and 720p resolution, 47 of these requests may be for the first format (e.g., HLS). Based on the threshold, the multicast controller 308 may determine to multicast (e.g., instruct one or more multicast servers 307 to setup multicast stream(s)) the program at (1) a bitrate of 20 Mbit/s for the first codec at a resolution of 720p and the first format, (2) a bitrate of 20 Mbit/s for the first codec at a resolution of 720p and the second format, and (3) a bitrate of 20 Mbit/s for the second codec at a resolution of 720p and the first format. Multicast controller 308 may then unicast the program to the other devices.

While the above examples list some possible scenarios using combinations of one or more of the parameters and/or characteristics for the requested content to determine when to multicast content, aspects of the present disclose cover many other scenarios or combinations of the parameters and/or characteristics not explicitly disclosed herein. As such, any combination or one or more of the parameters and/or characteristics for the request content may be used to determine when to multicast content.

If at step 810, the multicast controller 308 determines that the content may be unicasted instead of multicasted, then process 800 may continue to step 811. At step 811, the gateway 311 may indicate to the CDN 305 to provide a unicast stream of the content to the gateway 311. The CDN 305 may then retrieve the unicast content from one or more servers (e.g., streaming server 306) and/or one or more content packagers (e.g., content packager 303). The CDN 305 may then transmit this unicast content (e.g., via one or more routers) to the gateway 311, which may store the content in a cache or memory. The gateway 311 may then transmit the unicast content to a CPE 312. The process 800 may then return to step 808, where the multicast controller 308 may determine whether the requested content should be multicast or unicast based on one or more of the content parameters associated with the requests. It may be noted that process 800 may be performed on the fragment level (e.g., process 800 may be performed for each content fragment). Accordingly, one fragment may be unicasted while a subsequent fragment may be multicasted, and another subsequent packet may be unicasted or multicasted, etc.

If at step 810, the multicast controller 308 determines that the content may be multicasted instead of unicasted, the process 800 may continue to step 812. At step 812, the multicast controller 308 may determine whether there may be adequate network resources to multicast the requested content, and if so, the multicast controller 308 may modify one or more characteristics or parameters associated with one or more multicast streams, such as bitrate, resolution, CODEC, content format (e.g., screen size, operating system compatibility, file type), and the like, at step 813. The multicast controller 308 may use the data structure configured at step 801 with a threshold (e.g., an available bandwidth threshold hold, etc.) to make this determination. According to some aspects, a threshold may vary based on network resources, where the network may include the CDN 305 and/or any network associated with one or more devices disclosed herein such as in FIGS. 1-3.

If at step 812, the multicast controller 308 determines that there may be adequate network resources to multicast the requested content, then the process 300 may continue to step 814.

If at step 812, the multicast controller 308 determines that there might not be adequate network resources to multicast the requested content, then the process 300 may continue to step 813. At step 813, the multicast controller 308 may determine to modify or change one or more parameters of the content to increase network resources (e.g., bandwidth) before instructing a multicast server 307 to set up the multicast stream for the content.

In one example, one or more multicasts may have already been setup for a requested program (e.g., at step 808), and one or more multicast servers 807 may be multicasting these streams of content formatted with a high bitrate and a high resolution. In such a situation, the network may become congested (e.g., limited resources and/or bandwidth). In such situations, the multicast controller 308 may use the data structure configured at step 801 (e.g., available bandwidth below a threshold level) to instruct a multicast server 307 to transmit the multicasted content at one or more lower/different parameters than may have been requested by a CPE 312 (e.g., multicast at a lower/different than requested bitrate and/or a lower/different than requested resolution until the network congestion frees up). For example, one or more CPEs 312 may request content formatted in high definition (HD). The multicast control 308 may determine that there may not be enough bandwidth to support the multicast of the content at 1080p and may instruct a multicast server 307 to multicast the content in a lower or standard definition (SD). In some cases, the more popular multicasted programs may still be multicasted, while the less popular programs may be unicasted.

In another example, one or more multicasts might not have already been for a requested program (e.g., at step 808). In such a situation, the network may already be congested (e.g., limited resources and/or bandwidth). In such situations, the multicast controller 308 may use the data structure configured at step 801 (e.g., available bandwidth below a threshold level) to determine to multicast the requested content (e.g., with a newly setup multicast stream) at one or more lower/different parameters than may have been requested by a CPE 312 (e.g., multicast at a lower/different than requested bitrate and/or a lower/different than requested resolution until the network congestion frees up). For example, one or more CPEs 312 may request content formatted in high definition (HD). The multicast control 308 may determine that there may not be enough bandwidth to support the multicast of the content at 1080p, and may instruct a multicast server 307 to multicast the content in a lower or standard definition (SD).

The process 300 may then return to step 812 to determine whether there may be adequate network resources to multicast the requested content. If at step 812, the multicast controller 308 determines that there may be adequate network resources to multicast the requested content, then the process 300 may continue to step 814.

At step 814, the multicast controller 308 may instruct a multicast server 307 to setup (or continue to multicast in the case of a stream that may have already been set up) a multicast stream for the requested content. According to some aspects, the multicast server 307 may serve a geographical location covering the requesting termination system 310 and/or gateway 311). According to some aspects, the multicast controller 308 may instruct a multicast server 307 to transmit the requested content in a multicast stream formatted with one or more parameters, such as the one or more parameters that the CPEs 312 may have requested. According to some aspects, the multicast controller 308 may instruct a multicast server 307 to transmit the requested content in a multicast stream formatted with one or more parameters that may differ from the one or more parameters that the CPEs 312 may have requested, such as determined via steps 812 and 813. According to some aspects, a multicast content stream may be identified by a location identifier, such as a multicast IP address and/or a multicast source, group, and/or port number. The multicast controller 308 may then transmit to the termination system 310 and/or gateway 311 the multicast stream location identifier information. In some cases, a gateway 311 might not have proper credentials for accessing content, such as when the gateway 311 might not be validated on a network associated with the local office 103. In such situations, the multicast controller 308 might not transmit the multicast stream location identifier information to the termination system 310 and/or gateway 311.

At step 816, the multicast controller 308 may instruct the multicast server 307 to transmit (or continue to transmit in the case of a stream that may have already been set up)) the requested content in a multicast stream at the stream location (e.g., the multicast IP address and/or a multicast source, group, and/or port number).

At step 818, the gateway 311 may join (e.g., via a IGMP message) the termination system 310 and may request content from the identified stream location (e.g., the multicast IP address and/or a multicast source, group, and/or port number).

At step 820, the termination system 310 may send a join request (e.g., PIM join) to a routing network that may be connected to the multicast server 307 transmitting the multicast stream containing the requested content. The routing network may then direct the multicast stream from the multicast server 307 transmitting the requested content, and may route the multicast stream to the correct termination system 310 (e.g., the termination system 310 that may be requesting content at the identified stream location).

At step 822, the termination system 310 may transmit the multicasted content to the gateway 311. The gateway 311 may store the content (e.g., fragments) in a cache or other memory.

At step 824, the gateway 311 may determine whether the content (e.g., multicasted content) requested by CPE 312 may be located in gateway 311's cache, such as when the CPE 312 tries to retrieve content from the gateway cache. For example, there may be a cache miss in retrieving the multicasted content, such as if there may be a network adjustment to CDN 305. In other situations, the content might not have been transmitted to the gateway cache. According to some aspects, the multicast controller 308 may determine whether to multicast requested content based on the elapsed amount of time since a device (e.g., a gateway device 311 or a CPE 312) may have begun to request content. For example, there may be a threshold for the amount of time the gateway device 311 has begun to request content, such as 5 seconds. For example, a user may change a channel of a set-top box, which may then begin to request content for the current channel. In such situations, the multicast controller 308 may implement a threshold time period for a device to access/request the content, such that when the threshold might not satisfied (e.g., the device might not have accessed the content for 5 seconds), requested content may be transmitted in a unicast, and when the threshold may be satisfied (e.g., the device may have accessed the content for 5 seconds), the requested content may be transmitted in a multicast. For example, when the gateway 311 informs the multicast controller 308 that a CPE 312 has changed a channel, the CDN 305 may initially transmit a unicast stream to that gateway 311. This may save resources, such as bandwidth, because the user of the CPE 312 may subsequently change the channel again before really getting a chance to view the content (e.g., channel surfing). If the CPE 312 might not change the channel (e.g., satisfying a threshold time period), then the multicast controller 308 may instruct a multicast server 307 to transmit a multicast stream (e.g., which may depend on any of the above characteristics).

If the content might not be located in the cache, then the process 800 may continue to step 826. At step 826, the gateway 311 may request and retrieve the requested content (e.g., fragment) from CDN 305 as unicast content. The CDN 305 may then retrieve the unicast content from one or more servers (e.g., streaming server 306) or from one or more content packagers (e.g., content packager 303). The CDN 305 may then transmit the unicast content to the gateway 311, which may then transmit the unicast content to the CPE 312. The process 800 may then continue to step 830.

If at step 824, the requested content may be stored as multicasted content in gateway 311's cache, then the process may continue to step 828. At step 828, the gateway 311 may transmit the multicasted content (e.g., fragment) to the CPE 312. The process 800 may then continue to step 830.

At step 830, the gateway 311 determines whether the CPE 312 may be still requesting the content. If at step 830, the gateway 311 determines that the CPE 312 may be still requesting the content, the process 800 may return to step 824 to determine whether subsequent requested content may be located in gateway 311's cache. If at step 830, the gateway 311 determines that the CPE 312 might not be still requesting the content, the process 800 may return to step 802, where the CPE 312 may transmit a subsequent request for content. In some embodiments, the process 800 may be performed on a fragment by fragment basis. Thus, the multicast controller 308 (e.g., via a multicast server 307) may switch between transmitting content in a multicast or a unicast content. This change may be made on a fragment to fragment basis. For example, for the same content item (e.g., same program), a first fragment may be transmitted in a multicast, a second fragment may be transmitted in a unicast, while a third fragment may be transmitted in a multicast. These fragments may be of the same length (e.g., 2 seconds long) or of varying length (e.g., the first fragment being 1 second, the second fragment being 3 seconds, the third fragment being 2 seconds, and the like). In some embodiments, different multicast (or unicast) fragments may be formatted with different parameters. For example, a first multicast packet for a program may be formatted at 720p at a bitrate of 20 Mbits/s, while a second multicast packet for the same program may be formatted at 480i at a bitrate of 3.5 Mbits/s. The switching between multicast and unicast fragments may be based on network resources and/or congestion, as stated above, be based on the number of requests, and/or be based on characteristics of the requests. Thus, one fragment of a content item may be unicasted, while a subsequent fragment of the same content item may be multicasted.

Thus, in one example, if network resources may be strained (e.g., above a threshold indicated in the data structure configured at step 801), the multicast controller 308 may determine that fewer multicasts streams may be needed, thus freeing up some network resources. Alternatively, in another example, if network resources are strained, the multicast controller 308 may determine that more multicasts streams may be needed so as to eliminate unicast streams (which may use more network resources than multicast streams). In some situations, the multicast controller 308 may determine an optimal amount of multicast streams for current (and/or future) network resources. This optimal amount may fluctuate in accordance with the number of requests for content, number of current multicast streams being transmitted, number of unicast streams being transmitted, characteristics of the content being transmitted (e.g., resolution, bitrate, codec, streaming format, etc.), available network resources, and the like. In some embodiments, this optimal amount of multicast streams may include the multicast streams transmitting the most popular content and/or channels, such as the most requested content and/or the most requested types of content (e.g., content requested in high definition at a high bitrate on a particular CODEC). In some other embodiments, this optimal amount of multicast streams might not include the multicast streams transmitting the most popular content and/or channels. For example, multicast controller 308 may determine that network resources may be better used if a the third, fourth, and fifth ranked most popular content may be transmitted via multicast and the first and second most popular content may be transmitted via unicast. This may result from the location of the multicast servers 307 transmitting the multicasts, the number of routers used to transmit the content, as well as other reasons.

According to some aspects, the process 800 may repeat any step or may end after any step.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
    receiving, by a computing device and from a plurality of client devices, a plurality of requests for a version of a content item formatted according to a content parameter;
    selecting between multicast delivery and unicast delivery to deliver, for each of the plurality of client devices, the version of the content item formatted according to the content parameter, wherein the selecting is based on:
        a determination of whether a quantity of the plurality of requests satisfies a threshold;
        a determination of whether network resources satisfy a threshold value;
        a plurality of heartbeat messages received from the plurality of client devices; and
        an elapsed amount of time since one of the plurality of client devices requested the version of the content item; and
    initiating, based on the selecting, a multicast delivery to deliver, to one or more of the plurality of client devices, the version of the content item formatted according to the content parameter.

2. The method of claim 1, further comprising:
    after initiating the multicast delivery, monitoring the network resources; and
    continuing the multicast delivery to deliver, to the one or more of the plurality of client devices and based on a determination that the network resources satisfy the threshold value, the version of the content item formatted according to the content parameter.

3. The method of claim 1, further comprising:
    after initiating the multicast delivery, monitoring the network resources; and
    changing the multicast delivery to unicast delivery to deliver, to the one or more of the plurality of client devices and based on a determination that the network resources do not satisfy the threshold value, at least a portion of the content item formatted according to a second content parameter instead of the content parameter.

4. The method of claim 1, wherein the multicast delivery comprises sending, to the one or more of the plurality of client devices, the version of the content item, via an Internet Protocol (IP) or a Hypertext Transfer Protocol (HTTP).

5. The method of claim 1, wherein the plurality of heartbeat messages are periodic messages indicating whether the plurality of client devices is interested in the multicast delivery of the content item.

6. The method of claim 1, wherein the selecting is further based on a determination of whether a quantity of the plurality of heartbeat messages satisfies a threshold.

7. The method of claim 1, further comprising:
    sending, to the plurality of client devices and prior to receiving the plurality of requests:
        rules for parsing a packaging format of the version of the content item; and
        data indicating at least a minimum quantity, of the version of the content item, is to be stored at the plurality of client devices.

8. The method of claim 1, wherein the initiating the multicast delivery comprises:
    initiating a multicast stream for the version of the content item, wherein the multicast stream is associated with a multicast source identifier, a multicast group identifier, and a port identifier; and
    sending, to the one or more of the plurality of client devices, the multicast source identifier, the multicast group identifier, and the port identifier.

9. The method of claim 1, wherein the content parameter is associated with one or more of resolution, codec, or bitrate.

10. The method of claim 1, wherein the initiating is based on a determination that an available network bandwidth associated with a communication channel satisfies the threshold value.

11. The method of claim 1, further comprising:
    receiving, from a second plurality of client devices, a second plurality of requests for a second version of a content item formatted according to a second content parameter; and initiating a unicast delivery to deliver, to each of the second plurality of client devices and based on a determination that a quantity of the second plurality of requests does not satisfy the threshold, the second version of the content item formatted according to the second content parameter.

12. The method of claim 1, wherein the selecting is further based on a determination that the elapsed amount of time satisfies a second threshold.

13. A method comprising:
receiving, by a computing device and from a plurality of client devices, a plurality of requests for a content item;
determining, from the plurality of client devices, a first subset of the plurality of client devices to be associated with multicast delivery and a second subset of the plurality of client devices to be associated with unicast delivery, wherein the determining is based on:
a determination of whether a threshold quantity of the first subset indicated a same parameter associated with the content item;
a determination of whether network resources associated with each of the first and second subsets of the plurality of client devices satisfy a threshold value;
a plurality of heartbeat messages received from the plurality of client devices; and
an elapsed amount of time since one or more of the plurality of client devices requested the content item; and
sending, to the first subset of the plurality of client devices and via one or more multicast streams, the content item formatted according to the same parameter; and
sending, to the second subset of the plurality of client devices and via one or more unicast streams, the content item.

14. The method of claim 13, wherein the sending, to the first subset of the plurality of client devices, the content item, comprises sending, to the first subset of the plurality of client devices, the content item via an Internet Protocol (IP) or a Hypertext Transfer Protocol (HTTP).

15. The method of claim 13, wherein the plurality of heartbeat messages are periodic messages indicating whether one or more of the plurality of requests remain active.

16. The method of claim 13, wherein the determining is further based on a determination of whether a quantity of the plurality of heartbeat messages satisfies a threshold.

17. The method of claim 13, wherein sending, to the first subset of the plurality of client devices, the content item formatted according to the same parameter comprises:
initiating a multicast stream for the content item, wherein the multicast stream is associated with a multicast source identifier, a multicast group identifier, and a port identifier; and
sending, to the first subset of the plurality of client devices, the multicast source identifier, the multicast group identifier, and the port identifier.

18. The method of claim 13, wherein
the same parameter associated with the content item is associated with one or more of resolution, codec, or bitrate.

19. The method of claim 13, wherein the determining is based on a plurality of elapsed amounts of time since the plurality of client devices requested the content item.

20. A method comprising:
receiving, by a computing device and from a plurality of client devices, a plurality of requests for a first version of a content item formatted according to a first content parameter; and
changing from unicast delivery to multicast delivery to deliver a second version of the content item, formatted according to a second content parameter, to the plurality of client devices, wherein the changing is based on:
a determination of whether a threshold quantity of the plurality of client devices indicated the second content parameter;
a determination of whether network conditions satisfy a threshold value;
a plurality of heartbeat messages received from the plurality of client devices; and
an elapsed amount of time since one or more of the plurality of client devices requested the second version of the content item.

21. The method of claim 20, further comprising sending, to the plurality of client devices, the content item via an Internet Protocol (IP) or a Hypertext Transfer Protocol (HTTP).

22. The method of claim 20, wherein the plurality of heartbeat messages are periodic messages indicating whether requests, for the first version of the content item and from the one or more of the plurality of client devices, remain active.

23. The method of claim 20, wherein the changing is further based on a determination of whether a quantity of the plurality of heartbeat messages satisfies a threshold.

24. The method of claim 20, wherein the changing further comprises:
initiating a multicast stream for the second version of the content item, wherein the multicast stream is associated with a multicast source identifier, multicast group identifier, and a port identifier; and
sending, to the plurality of client devices, the multicast source identifier, the multicast group identifier, and the port identifier.

25. The method of claim 20, wherein the changing further comprises initiating a multicast stream to deliver, to one or more of the plurality of client devices, the second version of the content item.

26. The method of claim 20, further comprising:
based on a determination that the network conditions do not satisfy the threshold value, modifying the network conditions to satisfy the threshold value.

27. The method of claim 20, wherein the second content parameter comprises one or more of resolution, codec, or bitrate associated with the content item.

28. The method of claim 20, wherein the changing is based on a plurality of elapsed amounts of time since the plurality of client devices requested the second version of the content item.

* * * * *

UNITED STATES PATENT AND TRADEMARK OFFICE
CERTIFICATE OF CORRECTION

PATENT NO. : 11,553,018 B2  
APPLICATION NO. : 14/681619  
DATED : January 10, 2023  
INVENTOR(S) : Mao et al.

Page 1 of 1

It is certified that error appears in the above-identified patent and that said Letters Patent is hereby corrected as shown below:

On the Title Page

Column 2, (57) Abstract, Line 9:
Delete "one more" and insert --one or more-- therefor In the Drawings Sheet 5 of 8, Fig. 5, Reference Numeral 504, Line 1:
Delete "Mutlicast" and insert --Multicast-- therefor Sheet 6 of 8, Fig. 6, Reference Numeral 612, Line 1:
Delete "Mutlicast" and insert --Multicast-- therefor In the Specification Column 19, Detailed Description, Line 29:
Delete "3070" and insert --307-- therefor Column 19, Detailed Description, Line 32:
Delete "317" and insert --307-- therefor Column 22, Detailed Description, Line 55:
Delete "112)" and insert --312)-- therefor Column 26, Detailed Description, Line 24:
Delete "807" and insert --307-- therefor Signed and Sealed this  
Twenty-fifth Day of June, 2024

Katherine Kelly Vidal  
*Director of the United States Patent and Trademark Office*